(12) United States Patent
Ventulett et al.

(10) Patent No.: US 8,989,694 B2
(45) Date of Patent: Mar. 24, 2015

(54) SYSTEM AND METHOD FOR TRACKING MOBILE RESOURCES DURING AN EMERGENCY CONDITION

(76) Inventors: Jonathan A. Ventulett, Atlanta, GA (US); Henry H. Hicks, III, Dunwoody, GA (US); Thomas P. Ventulett, Atlanta, GA (US); Mary Elizabeth Gorman, Atlanta, GA (US); Jeoffrey K. Moore, Powder Springs, GA (US); Brian Troxell, Kennesaw, GA (US); David Petchey, Mill Valley, CA (US); Peter Kennard, Brooklyn, NY (US)

( * ) Notice: Subject to any disclaimer, the term of this patent is extended or adjusted under 35 U.S.C. 154(b) by 654 days.

(21) Appl. No.: 12/619,371

(22) Filed: Nov. 16, 2009

(65) Prior Publication Data

US 2010/0210282 A1 Aug. 19, 2010

Related U.S. Application Data

(63) Continuation of application No. PCT/US2008/006427, filed on May 19, 2008.

(60) Provisional application No. 60/930,593, filed on May 17, 2007.

(51) Int. Cl.
*H04M 11/04* (2006.01)

(52) U.S. Cl.
CPC .................................. *H04M 11/04* (2013.01)
USPC .................. 455/404.1; 455/404.2; 455/456.1; 455/414.2

(58) Field of Classification Search
USPC ..................... 455/404.1, 404.2, 456.1, 414.2; 701/213; 370/989
See application file for complete search history.

(56) References Cited

U.S. PATENT DOCUMENTS

| | | | |
|---|---|---|---|
| 2002/0193127 A1* | 12/2002 | Martschitsch | 455/466 |
| 2004/0048629 A1* | 3/2004 | Yoon | 455/466 |
| 2005/0202836 A1* | 9/2005 | Schaedler et al. | 455/466 |
| 2006/0198350 A1* | 9/2006 | Kim | 370/338 |
| 2007/0105528 A1* | 5/2007 | Haas et al. | 455/404.1 |

* cited by examiner

*Primary Examiner* — Ariel Balaoing
(74) *Attorney, Agent, or Firm* — Todd Partners, P.C.; Jack D. Todd

(57) ABSTRACT

A system for remotely monitoring and tracking a mobile hand-held device having conventional voice and data communication capabilities, the mobile device having software installed thereon that establishes a data communication link with the server, detects activation of an emergency button on the mobile device that places the device in an emergency operating condition, and, while operating in emergency condition, (i) blocks non-emergency input into the device, (ii) at predetermined time intervals, determines the current location of the mobile hand-held device based on GPS tracking information and mobile communication information, (iii) stores the time-based tracking data in memory, and (iv) using the data communication link, periodically transmits a telematics logic message to the server, wherein the telematics logic message include a unique device ID, an indicator of the emergency condition, and the time-based tracking data.

20 Claims, 16 Drawing Sheets

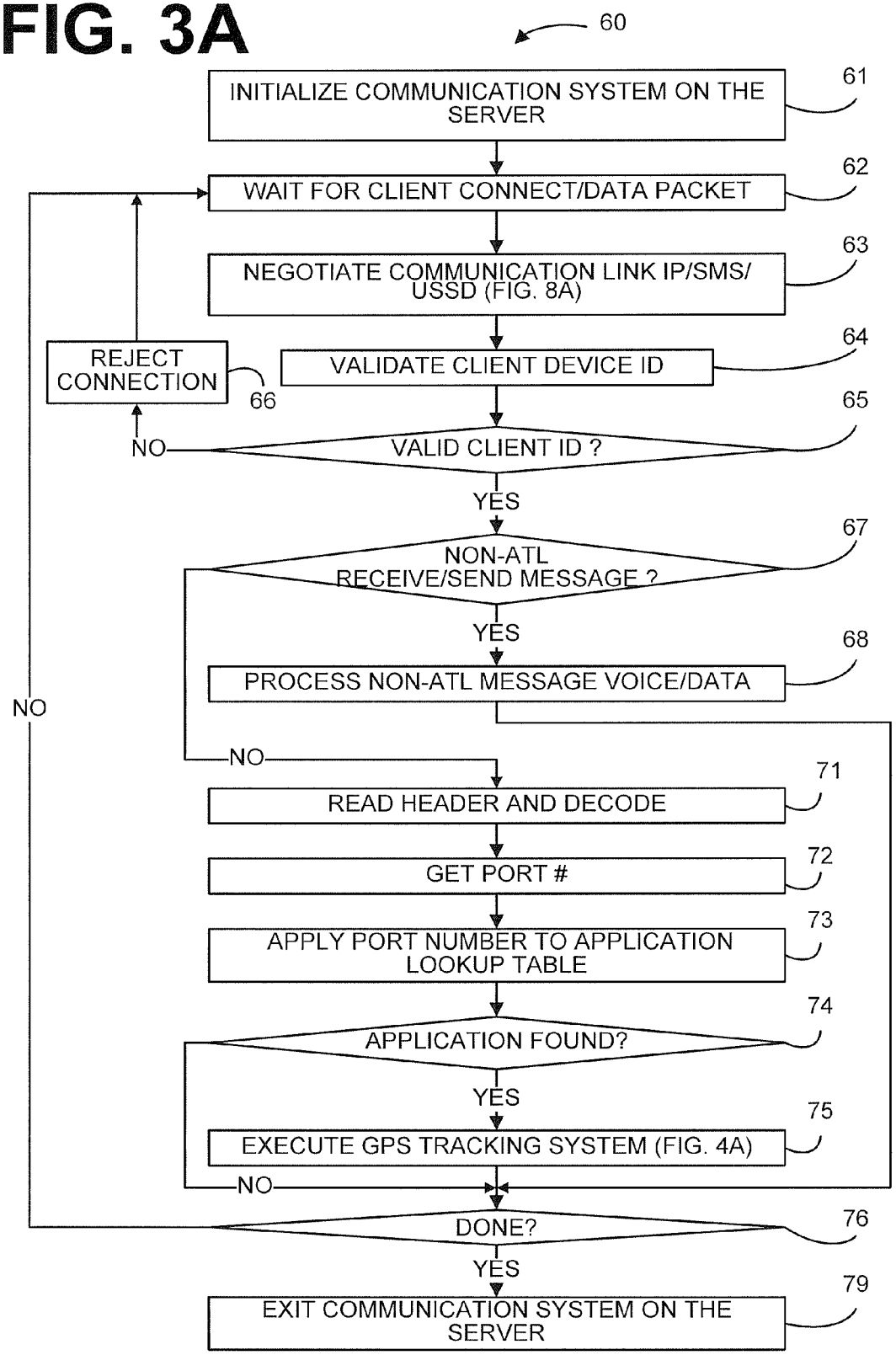

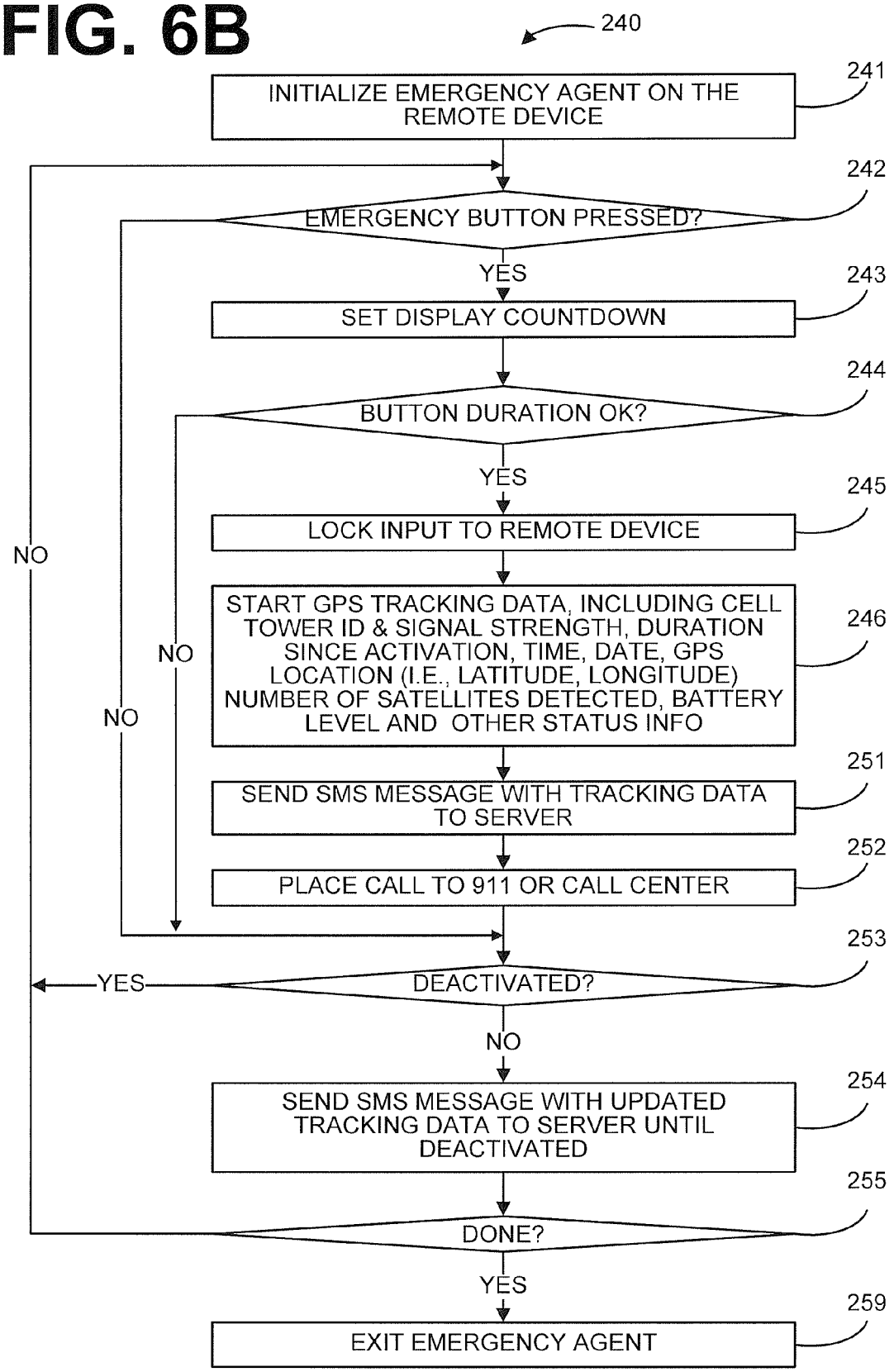

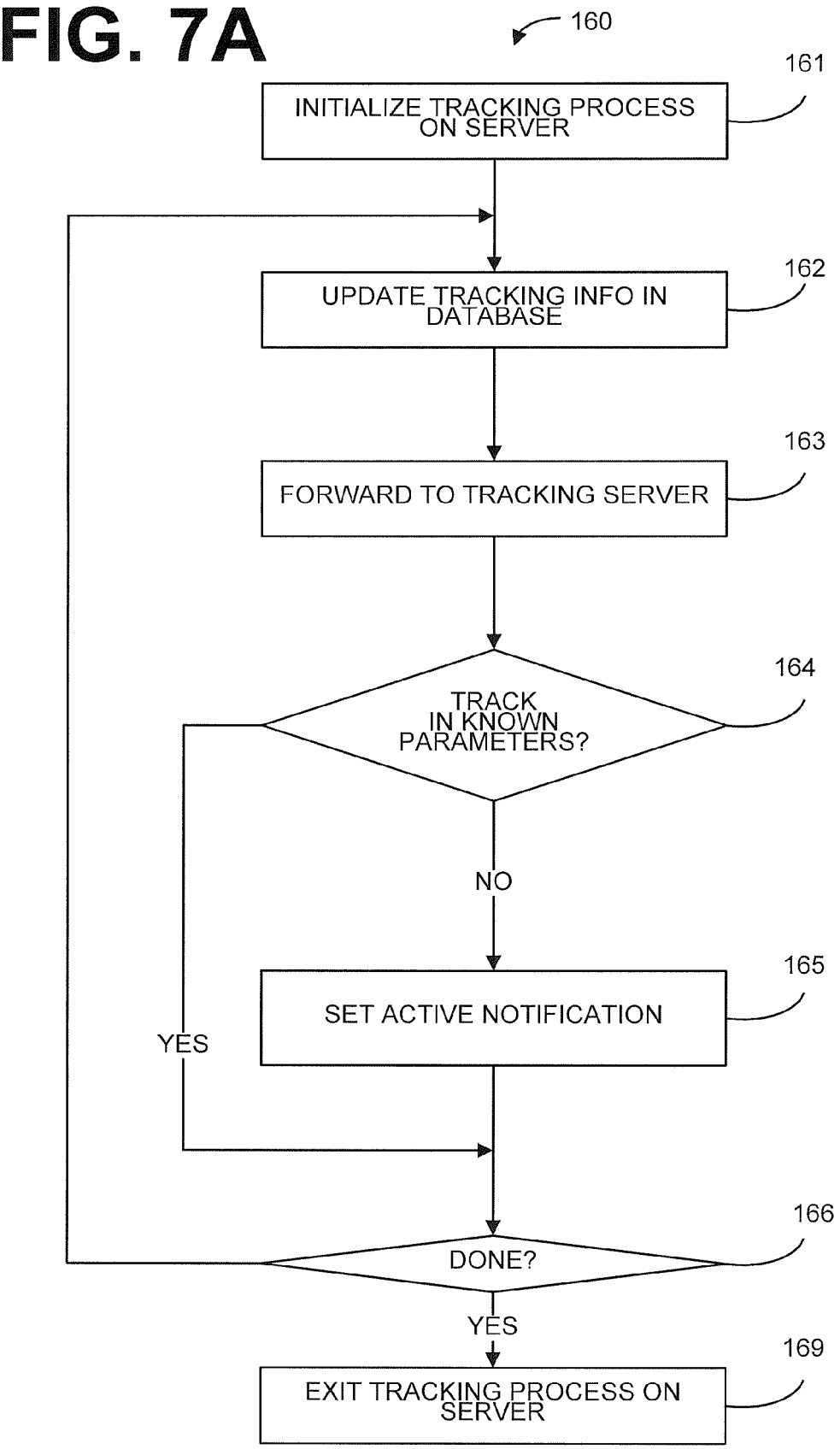

SYSTEM AND METHOD FOR TRACKING MOBILE RESOURCES DURING AN EMERGENCY CONDITION

CROSS-REFERENCE TO RELATED APPLICATIONS

This application is a continuation of International Application PCT/US2008/006427 with an International Filing Date of May 19, 2008, entitled "A SYSTEM AND METHOD FOR PROVIDING TRACKING FOR MOBILE RESOURCES OVER A NETWORK" and claiming priority to U.S. Patent Application Ser. No. 60/930,593, filed on May 17, 2007, entitled "SYSTEM FOR TRACKING MOBILE RESOURCES OVER A CELLULAR NETWORK", both of which are incorporated by reference herein in their entirety.

FIELD OF THE INVENTION

The present invention relates to a method and system for notifying users of events, and more particularly, relates to a method and system for providing tracking of mobile devices over a network.

BACKGROUND OF THE INVENTION

The term telematics is often used to refer to automobile based asset tracking systems that combine global positioning system ("GPS") satellite tracking and wireless communications for automatic tracking and remote diagnostics.

Typically, a telematics system includes services, platforms, networks, and positioning technologies. The services provided by the telematics system may include automatic roadside assistance, accident notification, traffic information, diagnostics, mobile Internet access, fleet management, and navigation. The platforms on which the telematics system may update may include servers, gateways, and billing and customer-care call centers. The networks by which communications are provided may include voice, short messaging system ("SMS") messaging, wireless application protocol ("WAP"), Internet Protocol ("IP"), Instant Messaging ("IM"), Satellite Communications, and/or other mobile data transport protocols. The freight sector clients serviced by the telematics system may include passenger vehicles, trucks, freight, public safety applications. Typically, telematics systems perform applications including vehicle or equipment (i.e. asset) location, driver concierge services, fleet management, and navigation/traffic information services.

Typically, an asset tracking device or module is installed in the vehicle to be tracked. The location of the device is determined by the telematics system using a positioning technology such as GPS or network triangulation such as time difference of arrival ("TDOA"). The location information is then provided to an application to service a customer.

GPS technology provides specially coded satellite signals that can be processed in a GPS receiver that enables the receiver to compute position, velocity and direction. The main problem with current GPS technology is the requirement for optimal environmental conditions for accuracy and it is independent of a communications network. Its advantage is that is can provide a location anywhere in the world without any additional infrastructure on the ground. Improved receiver performance and signal processing and new technologies, like "Enhanced GPS", will provide locations where traditional GPS would fail.

On the other hand, TDOA uses the existing cellular network infrastructure to determine location. The TDOA process requires signal timing information from at least three different antenna sites. At step 1, a handset or vehicle places a call (e.g. a 911 call). At step 2, antennae receive the signal from the handset or vehicle and pass it to a carrier's mobile switching office. At step 3, TDOA equipment measures the difference in the time the cellular radio signals arrive at the antenna sites and translate that data into location data (i.e. longitude and latitude data). At step 4, the carrier forwards voice call and location data to a Public Safety Answering Point ("PSAP"). The use of TDOA is typically restricted to areas where coverage from multiple towers is available.

The communications networks for linking tracking devices to platforms to provide services to customers include cellular and telephone networks. With respect to cellular networks, network providers typically make use of the Advanced Mobile Phone System ("AMPS") control channel frequencies for the transfer of small data packets. The use of the cellular network control channel provides more robust communication than cellular voice traffic so that it is possible to communicate with devices located in places where ordinary cell phones have marginal or intermittent voice coverage. Clients of these virtual carriers can make use of a TCP/IP data link to connect their operations centre to the virtual carrier network which then provides continent wide coverage through cellular service providers.

For example, in U.S. Pat. No. 6,131,067, to Girerd, et al, a client-server based system is described in which the location of a tracking device is determined using GPS information. This location is then reported to a user via the Internet.

While tracking assets is important, also of importance is the personal safety of users of the asset, such as a motor vehicle. It is recognized that most vehicles are or will be equipped with some form of tracking system. However, none of these systems are designed for personal handheld use, remotely programmable and integrated voice and data communications.

Thus, heretofore an unaddressed need exists in the industry to address the aforementioned deficiencies.

SUMMARY OF THE INVENTION

The present invention provides a system and method for providing communication link negotiation in a mobile device tracking system. In architecture, invention may be conceptualized as a system that includes a priority determination module that determines the priority of a message to be received on a mobile device, a SMS transmission module that transmits the message to the mobile device if the message is high priority, and a IP transmission module that transmits the message to the mobile device if the message is not high priority. Moreover, the system includes a first transition module that resends the message automatically using the SMS transmission module if the message sent by the IP transmission module was not received by the mobile device.

The present invention can also be viewed as a method for providing communication link negotiation in a mobile device tracking system. The method operates by (1) determining the priority of a message to be received by a mobile device; (2) transmitting the message to the mobile device using a SMS transmission means if the message is high priority; (3) transmitting the message to the mobile device using a IP transmission means if the message is not high priority; and (4) resending the message automatically using a SMS transmission means if the message sent by the IP transmission means was not received by the mobile device.

BRIEF DESCRIPTION OF THE DRAWINGS

The present invention, as defined in the claims, can be better understood with reference to the following drawings.

The components within the drawings are not necessarily to scale relative to each other, emphasis instead being placed upon clearly illustrating the principles of the present invention.

FIG. 3A is a flow chart illustrating an example of the operation of the communication system with the GPS tracking system of the present invention on the server, as shown in FIGS. 1 and 2A.

FIG. 6B is a flow chart illustrating an example of the operation of the emergency agent utilized on the remote device for the GPS tracking system of the present invention, as shown in FIGS. 2A-5B.

FIG. 7A is a flow chart illustrating an example of the operation of the tracking process utilized by the GPS tracking system of the present invention, as shown in FIGS. 2A-6A.

DETAILED DESCRIPTION OF THE INVENTION

Figure 1:
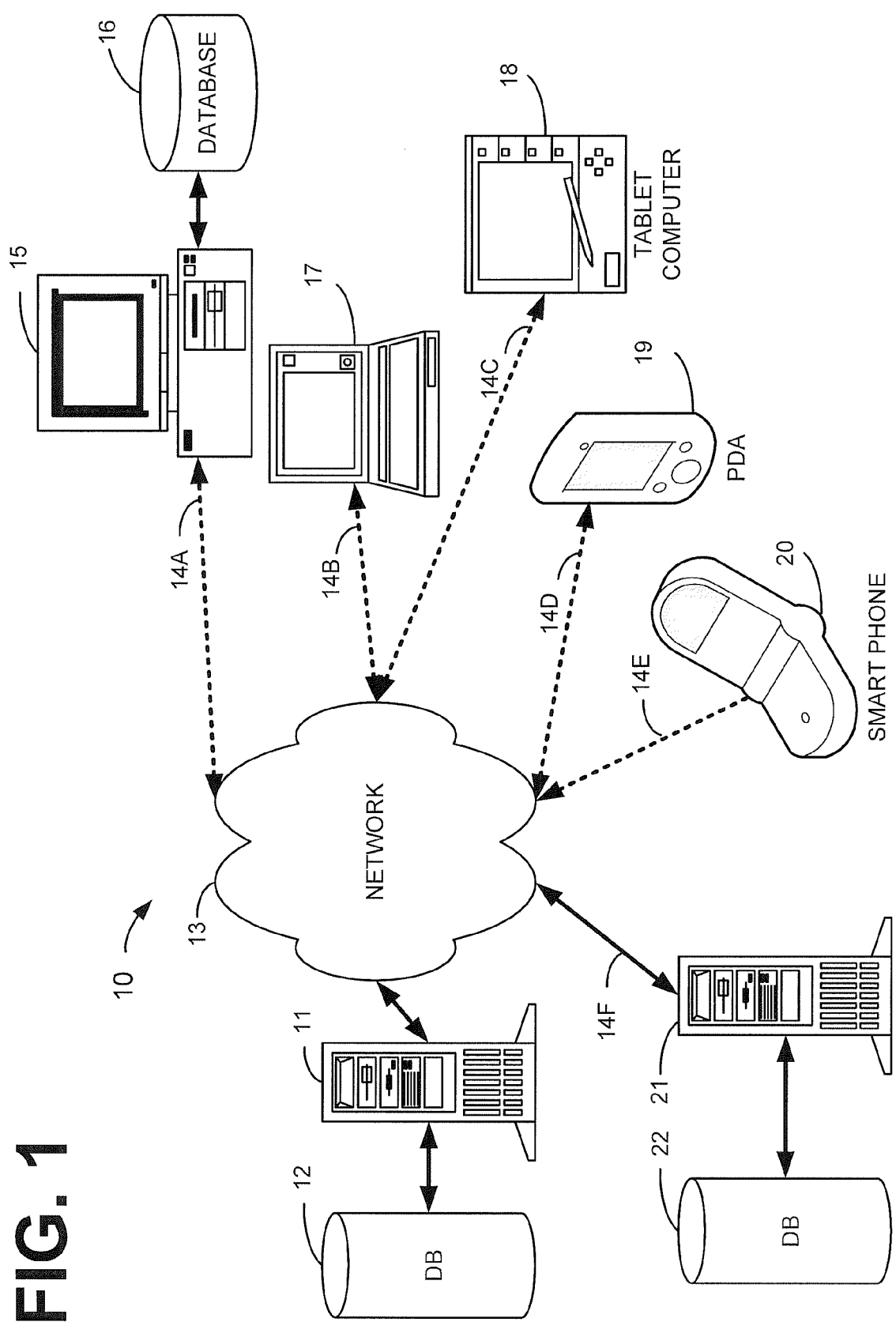
FIG. 1 is a block diagram illustrating an example of an environment of computer systems and the remote devices utilizing the GPS tracking system of the present invention.

The invention to be described hereafter is applicable to all remote devices using a GPS tracking system in the present invention providing tracking of mobile devices over a network. While described below with respect to a single computer, the system and method for a remote device GPS tracking system is typically implemented in a networked computing environment in which a number of computing devices communicate over a local area network (LAN), over a wide area network (WAN), or over a combination of both LAN and WAN.

The GPS tracking system of the present invention provides the following benefits: (1) integrated with remote devices such as GPS enabled cell phones; (2) remote system settings controls and management; and (3) remote configuration of simultaneous voice and data communications; and (4) emergency communications priority message handling.

The GPS tracking system of the present invention will work with carrier firewalls that allow connections initiated by the client and with those that provide for server initiated connections. The client initiated connections are necessary for some carriers in order to protect their users from unwanted and costly traffic. Client initiated connections also protect the carriers bandwidth as the carrier can terminate the connection after a predetermined amount of non usage. Since the clients are initiating the connection the client can connect with any type of remote device; including but not limited to: mobile devices, laptops, PCs, any type of computing devices and the like. Moreover, the GPS tracking system of the present invention is self configuring. Since the client is initiating the contact to the IP server and therefore presents its IP address for that connection. In those instances where the user connects via some other type of connection, SMS messaging technology will be utilized to provide a backup for event notification.

Mobile professionals will carry multiple mobile computing devices all of which have specific usage and connection characteristics, making each device uniquely appropriate for certain mobile usage situations. Given the diversity of devices an obvious user problem is the notification of event information including but not limited; to cellular communication, E-mail, calendar updates and alike on these remote devices.

The GPS tracking system of the present invention provides universal GPS tracking across all types of remote devices. The GPS tracking system of the present invention includes a server GPS tracking system and a client GPS tracking system. Descriptions of an example server GPS tracking system and client GPS tracking system are as follows.

The GPS tracking system on the server comprises four main sub-components: the configuration process, the emergency process, the tracking process and the negotiate communications link process. When the GPS tracking system initializes each of these sub-components is initialized, and each of these sub-components processes are activated relevant to their own responsibility until the GPS tracking system on the server is shut down.

The configuration process collects remote device ID, current configuration settings, new configuration settings, hardware and software version status, and other data.

The emergency process collects emergency priority handling protocol, emergency start messages, emergency continuation messages, user cancelations messages, $3^{rd}$ party cancelation messages, cancelation acknowledgement messages, messaging lock out protocol and remote device input lock out protocol and relevant command messages.

The tracking process is responsible for acquiring GPS data that will be transmitted, picking the best method of transmission, and performing the message transmission.

The negotiate communication link process will determine which method to use in order to transmit the message. If the communication process has registered the device as IP capable, the message will be sent over the IP link. Otherwise, the message will be sent via SMS/USSD over SMTP if the device is SMS capable.

If a device has been registered as IP capable, the tracking process will attempt to send the messages over the IP link. If the transmission occurs without error, the transmission for the message is complete. If errors do occur or the link is no longer available, or if the message is designated as an emergency, the message will be sent via SMS if the device is SMS capable. If the device is not SMS capable, the message will be sent via USSD. If the message is still not able to be sent, then it will be queued and will be later delivered.

The remote GPS tracking system on a remote device is responsible for receiving messages from the server, decrypting and decoding the messages, and performing the actions specified in the messages on the client device. The remote GPS tracking system may receive messages from SMS and/or IP sources. For SMS, the remote GPS tracking system receives messages from the SMS subsystem on the device. For IP, the remote GPS tracking system must establish and maintain the link to the server itself.

Upon startup, the remote GPS tracking system connects to the communication process on the server on a predetermined port. After successful connection, the device sends its device ID to the server in order to identify itself. After startup, the remote GPS tracking system waits for a message to arrive via SMS and/or IP or for a predetermined time period to expire. If the time period expires, the remote GPS tracking system checks the health of the IP connection. If the connection has been lost, the connection is reestablished with the server if possible. Then, if a good connection exists, the remote GPS tracking system resends its device ID to the server.

When a message arrives into the remote GPS tracking system, it will be decrypted with a key that has been previously agreed upon by the server and the remote device. The message is then removed from the transmission envelope and is checked to make sure it is a valid message. If the message is a valid message, the sequence number in the message is examined to see if it is a message that has already been processed. The remote GPS tracking system may receive multiple messages with the same sequence number if the remote device has been out of coverage and if the server has retried the transmission. Once the remote GPS tracking system has determined that it has a unique valid message, then it determines the proper client system to invoke in order to carry out the instructions contained within the message.

Referring now to the drawings, in which like numerals illustrate like elements throughout the several views, FIG. 1 is a block diagram illustrating an example of a remote GPS tracking system 10 environment including computer servers (11 and 21) and the remote devices (15, 17, 18, 19 and 20) that utilize the GPS tracking system of the present invention.

Each remote device has applications and can have a local data store 16. Computer servers 11 and 21 contain applications and server 11 further contains a server database 12 that is accessed by remote devices 15, and 17-20 via intermittent connections 14(A-F), respectively, over network 13. The server 11 runs administrative software for a computer network and controls access to part or all of the network and its devices. The remote devices 15 and 17-20 share the server data stored on the database 12 and may access the server 11 over a network 13 such as but not limited to; the Internet, a local area network (LAN), a wide area network (WAN), via a telephone line using a modem or other like networks. The server 11 may also be connected to the local area network (LAN) within an organization.

The structure and operation of the remote GPS tracking system enables the server 11 and the database 12 associated therewith to handle clients more efficiently than previously known systems. Particularly, the remote GPS tracking system of the present invention provides a manner of providing tracking of mobile devices over a network. When the remote devices 15 and 17-20 (FIG. 1) connect to the server 11, the identity and IP address information associated with the remote device are transmitted to the server to be used for delivering data to the remote device.

The remote devices 15 and 17-20 may each be located at remote sites. Remote devices 15 and 17-20 include but are not limited to; PCs, workstations, laptops, PDAs, pagers, WAP devices, non-WAP devices, cell phones, palm devices and the like. Thus, when a user at one of the remote devices 15 and 17-20 desires to update the current tracking information on the data at the server 11, the remote devices 15 and 17-20 communicates over the network 13, such as but not limited to WAN, internet, or telephone lines to access the server 11.

Advantageously, the present invention provides a system and method for notifying a remote device that there is GPS data ready for transfer from server 11. First, a remote device 15 registers with server 11 to tell them that a remote device is ready to receive data. Periodically, the server 11 determines if new data is available for a remote device 15. When a remote device 15 connects to the server 11 the remote device 15 downloads that data from the server 11.

Third party vendors servers 21 and databases 22 can be accessed by the server 11 in order to obtain information for dissemination to the remote devices. Information regarding the GPS position of the remote device, or tracking an emergency situation using a remote device. Data that is obtained from third party vendors server 21 and databases 22 can be stored on the server 11 in order to provide later access to the user remote devices 15 and 17-20. It is also contemplated that for certain types of data that the user remote devices 15 and 17-20 can access the third-party vendor's data directly using the network 13.

Figure 2A:
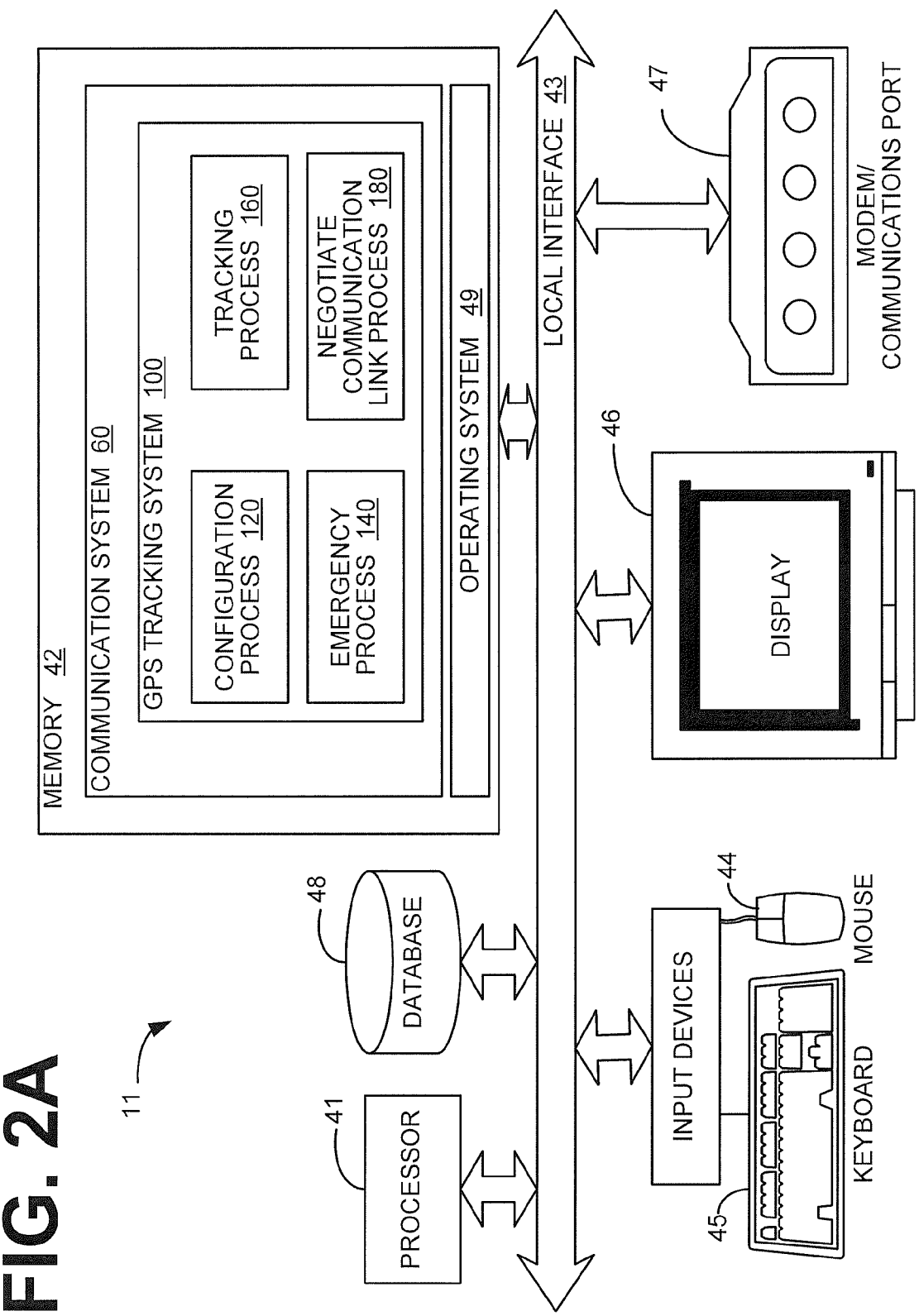
FIG. 2A is a block diagram illustrating an example of a server utilizing the GPS tracking system of the present invention, as shown in FIG. 1.
Figure 2B:
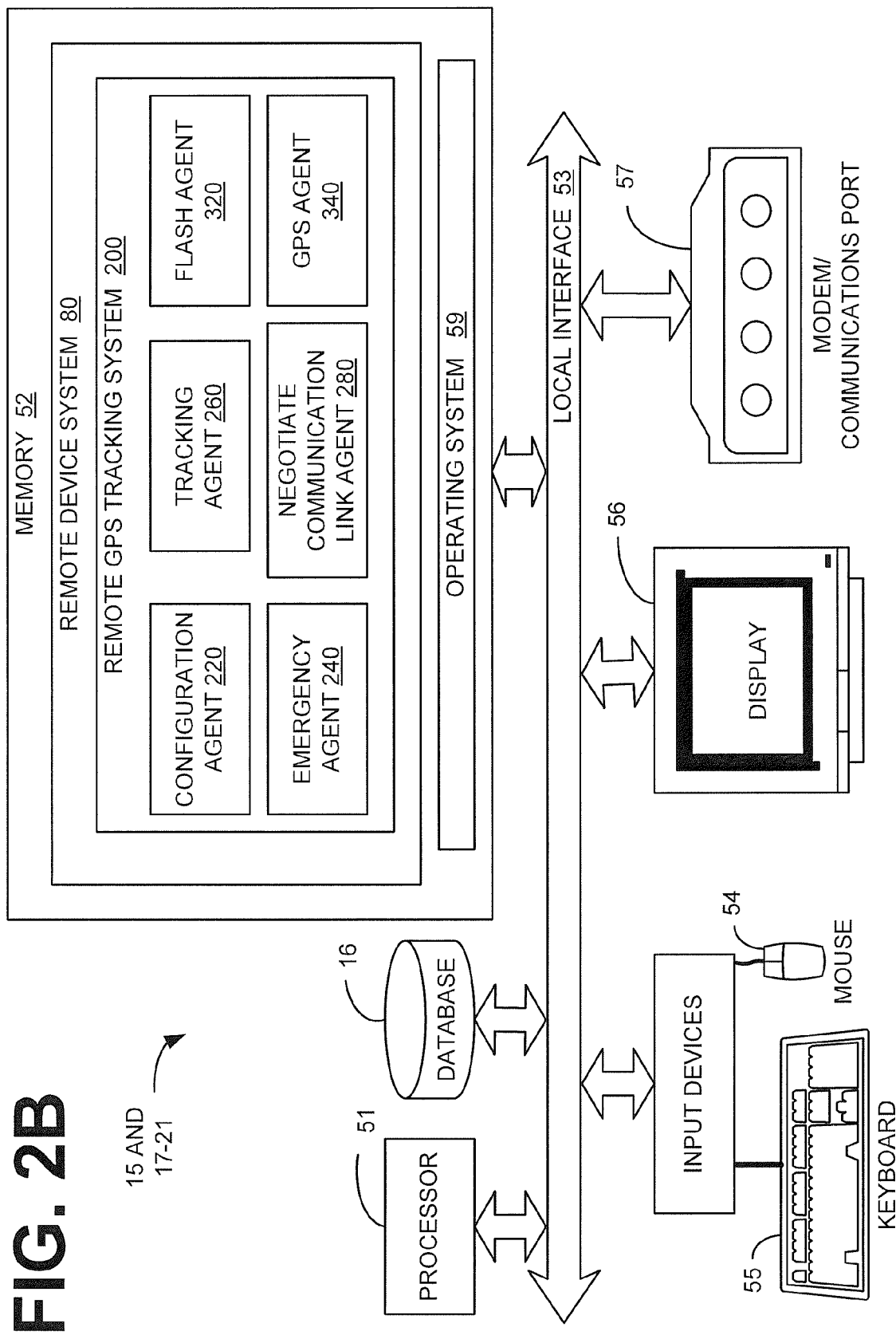
FIG. 2B is a block diagram illustrating an example of a remote device utilizing the GPS tracking system of the present invention, as shown in FIG. 1.

Illustrated in FIG. 2A is a block diagram demonstrating an example of a server 11, as shown in FIG. 1, utilizing the GPS tracking system 100 of the present invention. Illustrated in FIG. 2B is an example demonstrating a remote device utilizing the remote portion of the remote device GPS tracking system 200 of the present invention. Remote devices 15 and 17-20 include but are not limited to, PCs, workstations, laptops, PDAs, pagers, WAP devices, non-WAP devices, cell phones, palm devices and the like. The components of the remote device 15 and 17-20 are substantially similar to that of the description for the server 11 (FIG. 2A). However, it is contemplated that many of the components in the user's remote device 15 and 17-20 can be more limited in general function.

Generally, in terms of hardware architecture, as shown in FIG. 2A, the computer servers 11 and 21 herein includes a processor 41, memory 42, and one or more input and/or output (I/O) devices (or peripherals), such as database or storage 48, that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU) or an auxiliary processor among several processors associated with the computer servers 11 and 21, and a semiconductor based microprocessor (in the form of a microchip) or a macroprocessor. Examples of some suitable commercially available microprocessors include, but are not limited to: an 80×86, Pentium, Celeron, Xeon or Itanium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., read only memory (ROM), erasable programmable read only memory (EPROM), electronically erasable programmable read only memory (EEPROM), programmable read only memory (PROM), tape, compact disc (CD-ROM), DVD read on memory, magnetic disk, diskette, cartridge, cassette or the like, etc.). Moreover, the memory 42 may incorporate electronic, magnetic, optical, and/or other types of storage media. Note that the memory 42 can have a distributed architecture where various components are situated remote from one another, but still can be accessed by processor 41.

The software in memory 42 may include one or more separate programs, each of which comprises an ordered listing of executable instructions for implementing logical functions. In the example illustrated in FIG. 2A, the software in the memory 42 includes, but is not limited to, a suitable operating system (O/S) 49 and the GPS tracking system 100 of the present invention. The GPS tracking system 100 further includes the configuration process 120, emergency process 140, tracking process 160 and negotiate communication link process 180. The software components will be described in further detail with regard to FIG. 3A through FIG. 9.

A nonexhaustive list of examples of suitable commercially available operating systems 49 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc. Palm OS available from Palm Computing, Inc., and Windows Mobile available from Microsoft Corporation).

The operating system 49 essentially controls the execution of other computer programs, such as the GPS tracking system 100, and provides scheduling, input-output control, file and data management, memory management, and communication control and related services. However, it is contemplated by the inventors that the GPS tracking system 100 of the present invention is applicable on all other commercially available operating systems.

The GPS tracking system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 49. Furthermore, the GPS tracking system 100 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, ADA and the like.

The I/O devices may include input devices, for example but not limited to, a keyboard 45, mouse 44, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing other files, devices, systems, or a network), a radio frequency (RF) or other transceiver (not shown), a telephonic interface (not shown), a bridge (not shown), a router (not shown), etc.

If the computer servers 11 and 21 are a PC, workstation, intelligent device or the like, the software in the memory 42 may further include a basic input output system (BIOS) (omitted for simplicity). The BIOS is a set of essential software routines that initialize and test hardware at startup, start the O/S 49, and support the transfer of data among the hardware devices. The BIOS is stored in some type of read-only-memory, such as ROM, PROM, EPROM EEPROM or the like, so that the BIOS can be executed when the computer is activated.

When the computer servers 11 and 21 are in operation, the processor 41 is configured to execute software stored within the memory 42, to communicate data to and from the memory 42, and to generally control operations of the computer pursuant to the software. The GPS tracking system 100 and the O/S 49 are read, in whole or in part, by the processor 41, perhaps buffered within the processor 41, and then executed.

When the GPS tracking system 100 is implemented in software, as is shown in FIGS. 2A and 2B, it should be noted that the GPS tracking system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The GPS tracking system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the GPS tracking system 100 is implemented in hardware, the GPS tracking system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Illustrated in FIG. 2B is a block diagram demonstrating an example of a remote device 15 and 17-20 and third party vendors servers 21 utilizing the remote device GPS tracking system 200 of the present invention, as shown in FIG. 1. As illustrated, the remote device 15 and 17-20 includes many of the same components as server 11 described with regard to FIG. 2A. Hereinafter, the remote devices 15 and 17-20 will be referred to as remote device 15 for the sake of brevity.

Located in memory 52 is the remote device system 80, which includes, but is not limited to, the remote device GPS tracking system 200. Located in memory 52 is the remote device system 80, which includes, but is not limited to, the remote device GPS tracking system 200. The remote device GPS tracking system 200 further includes the configuration agent to 220, emergency agent 240, tracking agent 260, negotiate communication link agent 280, flashlight agent 320 and voice/data agent 340. The remote device GPS tracking system 200 and sub-components are herein defined in further detail with regard to FIG. 4B through FIG. 9. When the remote device GPS tracking system 200 is implemented in software, as is shown in FIG. 2B, it can be stored on virtually any computer readable medium for use by or in connection with any computer related system or method.

In an alternative embodiment, where the remote device system 80 is implemented in hardware, the remote device GPS tracking system 200 can be implemented in the same way as described above with regard to the GPS tracking system 100 (FIG. 2A). In the example illustrated, it is the remote device GPS tracking system 200 that interacts with the GPS tracking system 100 of the present invention.

FIG. 3A is a flow chart illustrating an example of the operation of the communication system 60 with the GPS tracking system 100 of the present invention on the server 11, as shown in FIGS. 1 and 2A. The communication system 60 negotiates the communication link to use between the server 11 and a remote device 15 and determines if the message is a standard voice data message or an airowireless telemetrics logic message.

First at step 61, the communication system 60 is initialized. This initialization includes the startup routines and processes embedded in the BIOS of the server 11. The initialization also includes the establishment of data values for particular data structures utilized in the server 11 and communication system 60. At step 62, the communication system 60 waits for a client connect or data packet. Upon acquiring or sending a data packet, the communication system 60 negotiates the communication link speed. In one embodiment this connection occurs on a predetermined port. However, it is understood that other types of connections may be utilized. At step 63, the negotiate communications link process is herein defined in further detail with regard to FIG. 8A.

The communication system 60 then validates the client device ID at step 64. At step 65, it is determined if the client ID for the client connect or data packet is valid. If it is determined at step 65 that the client ID for the communication sent or received is invalid, the communication system 60 then rejects the connection in step 66 and returns to wait for the next connection step 62.

However, if it is determined at step 65 that the client ID is valid, then the communication system 60 determines if the communication is a standard send and receive message at step 67. If it is determined that step 67 that the message is a standard send or receive message, then the message is processed at step 68, utilizing the current voice and data processing as currently available in the art.

However, it is determined to step 67 that the message received is not a standard message (i.e., an Airo Wireless Telematics Logic message), then the communication system 60 reads the header in the message and decodes in step 71. At step 72 the communication system 60 gets the port number from the message and looks up the application associated with that port in step 73.

At step 74, the communication systems 60 determines if an application was found utilizing the port number. If it is determined at step 74 that an application corresponding to the port number is not found, in the communication system 60 skips to step 76. However, if it is determined at step 74 that an application corresponding to the port number received in the message was found, then the communication system 60 executes the GPS tracking system at step 75. The GPS tracking system is herein defined in further detail with regard to FIG. 4A.

At step 76, it is determined if there are more messages to be processed. If it is determined at step 76 that there are more messages to be processed, then the communication system 60 returns to repeat steps 62 through 76. However, if it is determined at step 76 that there are no more messages to be processed, then the communication system 60 then exits at step 79.

Figure 3B:
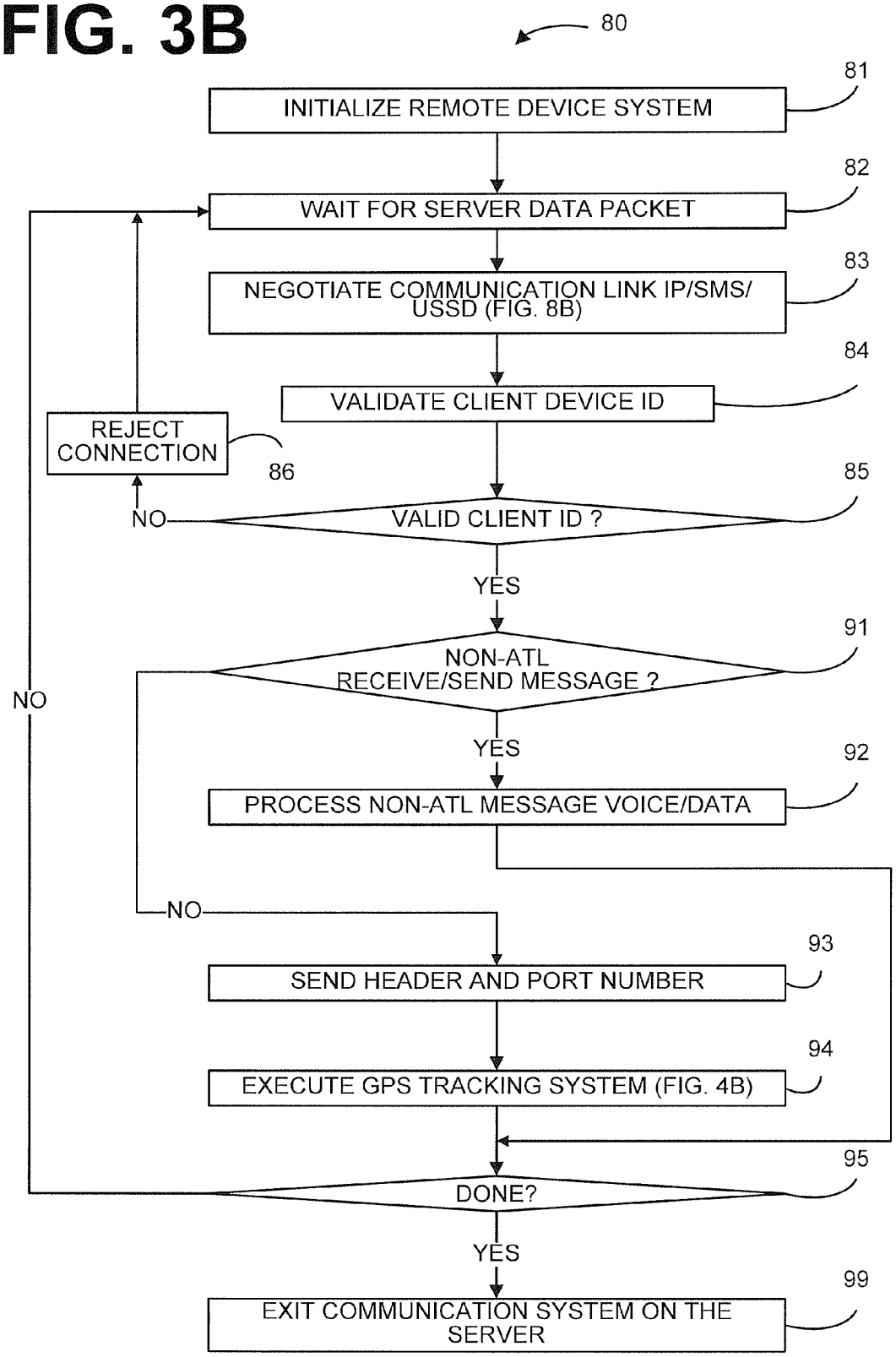
FIG. 3B is a flow chart illustrating an example of the operation of the remote device system with the GPS tracking system of the present invention on the remote device, as shown in FIGS. 1 and 2B.

FIG. 3B is a flow chart illustrating an example of the operation of the remote device system 80 with remote device GPS tracking system 200 of the present invention on the remote device 15, as shown in FIGS. 1 and 2B. The remote device system 80 negotiates the communication link to use between the remote device 15 and a server 11, and determines if the message is a standard voice data message or an Airo Wireless Telematics Logic message.

First at step 81, the remote device system 80 is initialized. This initialization includes the startup routines and processes embedded in the BIOS of the server 11. The initialization also includes the establishment of data values for particular data structures utilized in the server 11 and remote device system 80. At step 82, the remote device system 80 waits for a client connect or data packet. Upon acquiring or sending a data packet, the remote device system 80 negotiates the communication link speed. At step 83, the negotiate communications link agent is herein defined in further detail with regard to FIG. 8A.

The remote device system 80 then validates the client device ID at step 84. At step 85, it is determined if the client ID for the client connect or data packet is valid. If it is determined at step 85 that the client ID for the communication sent or received is invalid, the remote device system 80 then rejects the connection in step 86 and returns to wait for the next connection step 82.

However, if it is determined at step 85 that the client ID is valid, then the remote device system 80 determines if the communication is a standard send and receive message at step 91. If it is determined that step 91 that the message is a standard send or receive message, then the message is processed at step 92, utilizing the current voice and data processing as currently available in the art.

However, if it is determined in step 91 that the message received is not a standard message (i.e. an Airo Wireless Telematics Logic message), then the remote device system 80 sends the header and port number in the message to server 11 at step 93. At step 94, the remote device system 80 executes remote device GPS tracking system 200 on the remote device. The GPS tracking system is herein defined in further detail with regard to FIG. 4B.

At step 95, it is determined if there are more messages to be processed. If it is determined at step 95 that there are more messages to be processed, then the remote device system 80 returns to repeat steps 82 through 95. However, if it is determined at step 95 that there are no more messages to be processed, then the remote device system 80 then exits at step 99.

Figure 4A:
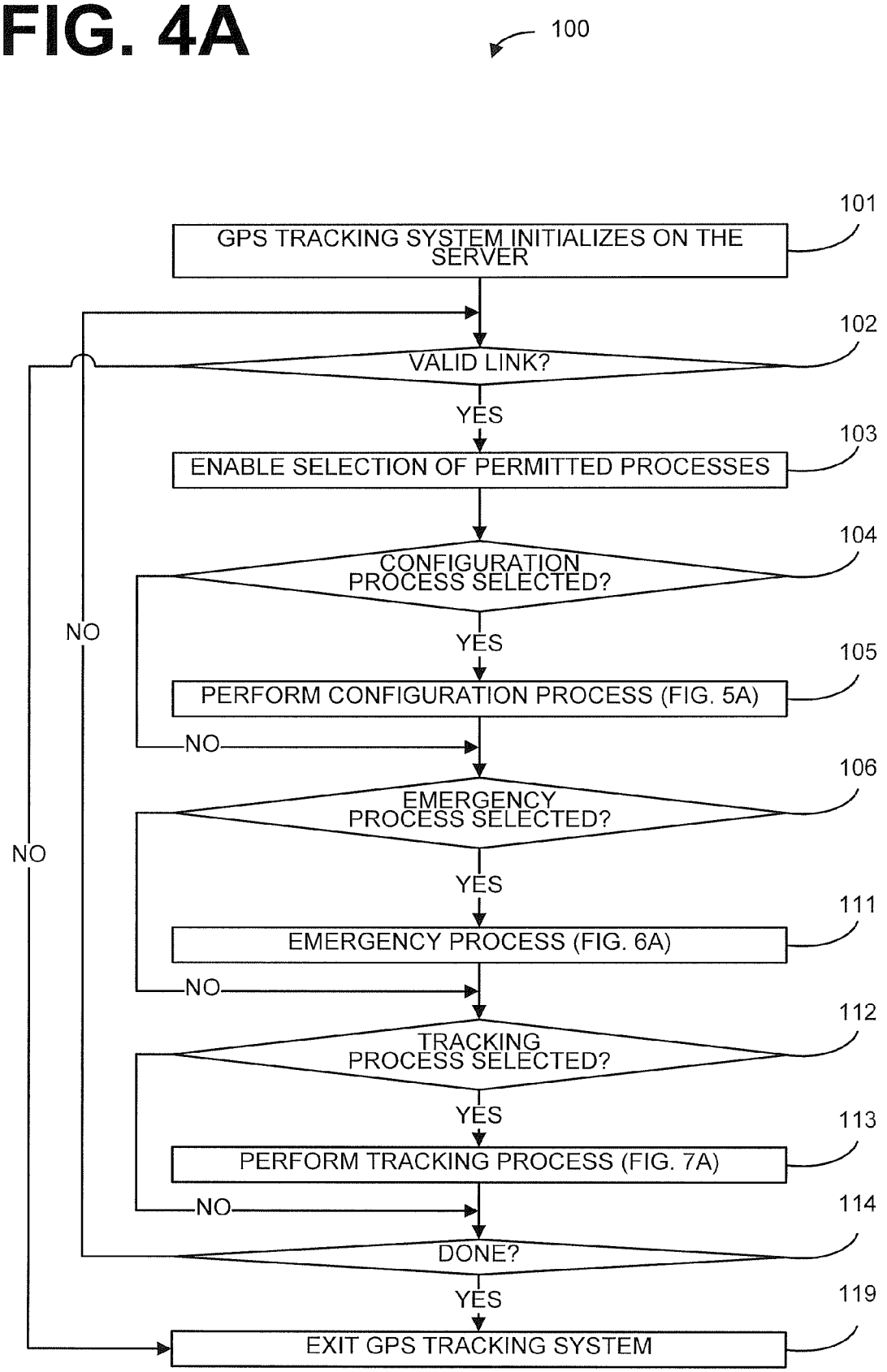
FIG. 4A is a flow chart illustrating an example of the operation of the GPS tracking system of the present invention on the server, as shown in FIGS. 1-3.

Illustrated in FIG. 4A is a flow chart describing an example of the operation of the GPS tracking system 100 of the present invention on a server 11, as shown in FIGS. 1 and 2A. The GPS tracking system 100 enables a user to obtain and submit tracking data with server 11 to be transferred to the remote device 15 and 17-20. The GPS tracking system 100 on server 11 comprises four sub-components: the configuration process 120, the emergency process 140, the tracking process 160, and the negotiate communication link process 180. After the GPS tracking system 100 is initialized, each of these sub-components is initialized and run in the background. Each of these sub-components processes events relevant to their own responsibility until the GPS tracking system 100 is shut down.

First at step 101, the GPS tracking system 100 is initialized. This initialization includes the startup routines and processes embedded in the BIOS of the server 11. The initialization also includes the establishment of data values for particular data structures utilized in the server 11 and GPS tracking system 100.

At step 102, the GPS tracking system 100 determines if the link the message was received on is valid. After successful connection, the remote device 15 sends its device ID and authentication information to the server 11 in order to identify itself. The message is then removed from the transmission envelope and is checked to make sure it is a valid message. If the message is a valid message, the sequence number in the message is examined to see if it is a message that has already been processed. The remote device 15 may send/receive multiple messages with the same sequence number if the remote device 15 has been out of coverage and if the server 11 has retried the transmission.

If it is determined in step 102 that the link is not valid, then the GPS tracking system 100 skips to exit at step 119. However, if it is determined at step 102 that link the message was received from is valid, and then the GPS tracking system 100 enables the selection of permitted processes at step 103. At step 104, it is determined if the configuration process is selected. If it is determined in step 104 that the configuration process was not selected, then the GPS tracking system 100 skips to step 106. However, if it is determined at step 104 that the configuration process was selected, then the configuration process is performed at step 105. The configuration process is herein defined in further detail with regard to FIG. 5A.

At step 106, it is determined if the emergency process is selected. If it is determined at step 106 that the emergency process is not selected, then the GPS tracking system 100 skips the step 112. However, if it is determined at step 106 that the emergency process was selected, then the emergency process is executed at step 111. The emergency process is herein defined in further detail with regard to FIG. 6A.

At step 112, it is determined that the tracking process is selected. If it is determined at step 112 that the tracking process was not selected, and the GPS tracking system 100 skips to step 114. However, if it is determined at step 112 at the tracking process was selected, then the tracking process is executed at step 113. The tracking process is herein defined in further detail with regard to FIG. 7A.

At step 114, it is determined that there are more messages and processes to be performed. If it is determined at step 114 that there are more messages and processes to be performed, then the GPS tracking system 100 returns to repeat steps 102 through 114. However, if it is determined at step 114 that there are no more processes or messages to be performed, then the GPS tracking system 100 exits at step 119.

Figure 4B:
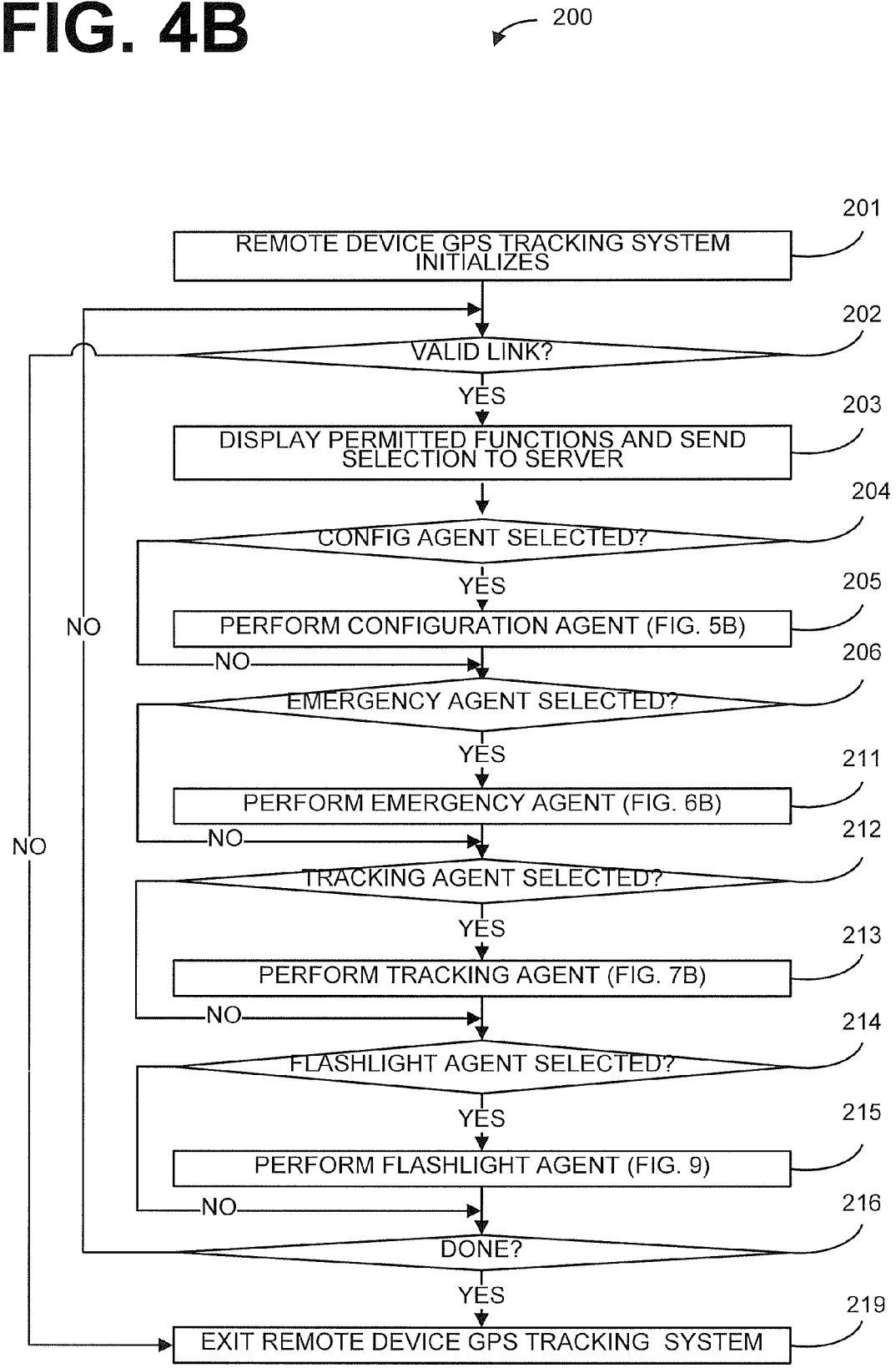
FIG. 4B is a flow chart illustrating an example of the operation of the remote device tracking system utilized by the GPS tracking system of the present invention, as shown in FIGS. 1-3.

Illustrated in FIG. 4B is a flow chart describing an example of the operation of remote device GPS tracking system 200 of the present invention on a remote device 15, as shown in FIGS. 1 and 2B. The remote device GPS tracking system 200 enables a user to obtain and submit tracking data with server 11 from the remote device 15. Remote device GPS tracking system 200 on remote device 15 comprises 5 sub-components: the configuration agent 220, the emergency agent 240, the tracking agent 260, the negotiate communication link agent 280 and the flashlight agent 320. After the remote device GPS tracking system 200 is initialized, each of these sub-components is initialized and run in the background. Each of these sub-components processes events relevant to their own responsibility until the remote device GPS tracking system 200 is shut down.

First at step 201, remote device GPS tracking system 200 is initialized. This initialization includes the startup routines and processes embedded in the BIOS of the remote device 15. The initialization also includes the establishment of data values for particular data structures utilized in the remote device 15 and remote device GPS tracking system 200.

At step 202, remote device GPS tracking system 200 determines if the link the message was received on is valid. If it is determined in step 202 that the link is not valid, then remote device GPS tracking system 200 skips to exit at step 219. However, if it is determined at step 202 that link the message was received from is valid, then remote device GPS tracking system 200 displays the permitted functions and sends the selection to the server 11 at step 203. At step 204, it is determined if the configuration agent is selected. If it is determined in step 204 that the configuration agent was not selected, then remote device GPS tracking system 200 skips to step 206. However, if it is determined at step 204 that the configuration agent was selected, then the configuration agent is performed at step 205. The configuration agent is herein defined in further detail with regard to FIG. 5B.

At step 206, it is determined if the emergency agent is selected. If it is determined at step 206 that the emergency agent is not selected, then remote device GPS tracking system 200 skips the step 212. However, if it is determined at step 206 that the emergency agent was selected, then the emergency agent is executed at step 211. The emergency agent is herein defined in further detail with regard to FIG. 6B.

At step 212, it is determined if the tracking agent is selected. If it is determined at step 212 that the tracking agent was not selected, then remote device GPS tracking system 200 skips to step 214. However, if it is determined at step 212 at the tracking agent was selected, then the tracking agent is executed at step 213. The tracking agent is herein defined in further detail with regard to FIG. 7B.

At step 214, it is determined, if the flashlight agent is selected. If it is determined that step 214 at the flashlight agent is not selected, then remote device GPS tracking system 200 skips to step 216. However, if it is determined at step 214 at the flashlight agent was selected, then the flashlight agent is executed at step 215. The flashlight agent is herein defined in further detail with regard to FIG. 9.

At step 216, it is determined that there are more messages and processes to be performed. If it is determined at step 216 that there are more messages and processes to be performed, then remote device GPS tracking system 200 returns to repeat steps 202 through 216. However, if it is determined at step 216 that there are no more processes or messages to be performed, then the remote device GPS tracking system 200 exit that step 219.

Figure 5A:
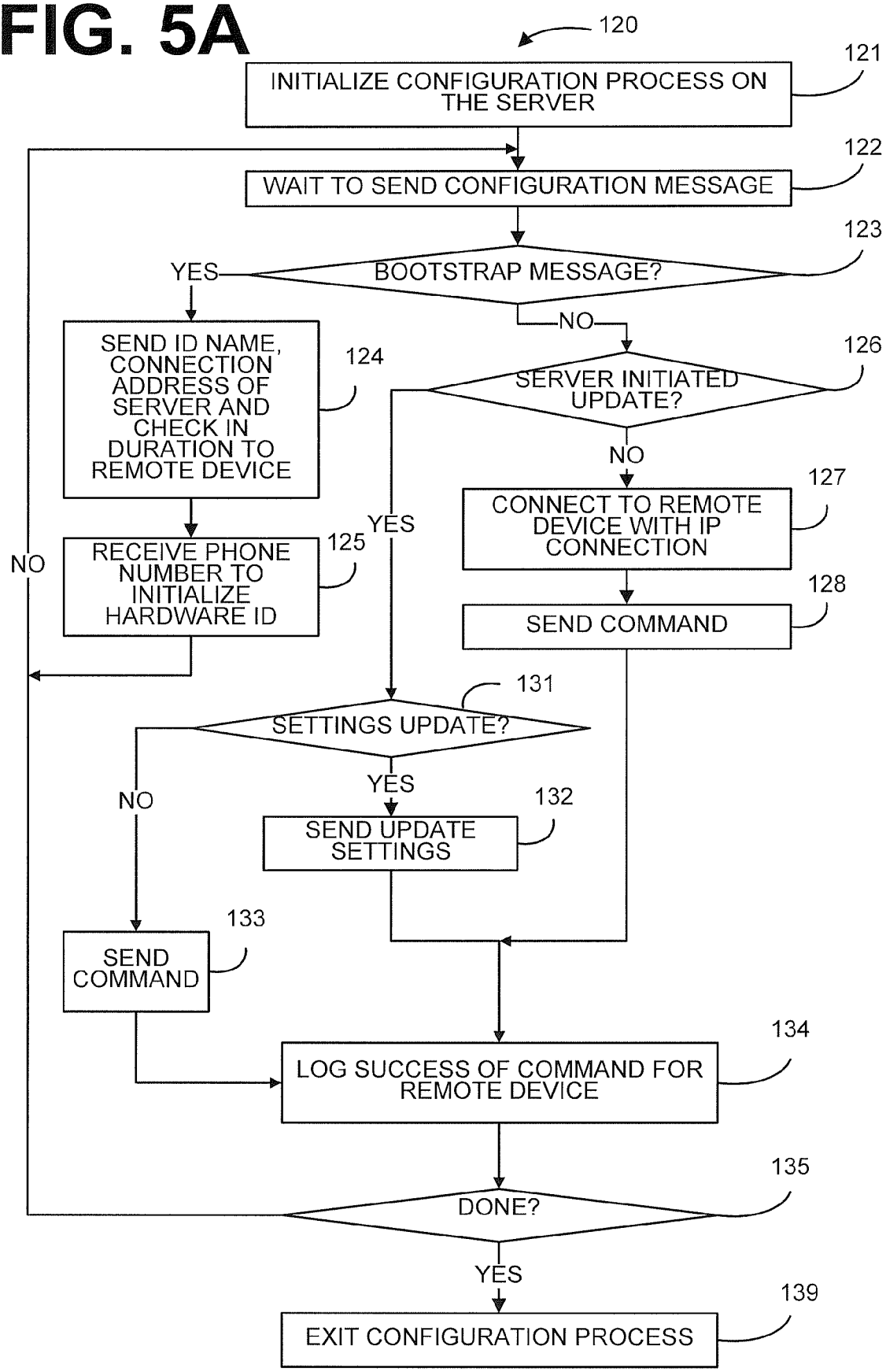
FIG. 5A is a flow chart illustrating an example of the operation of the configuration process utilized by the GPS tracking system of the present invention, as shown in FIGS. 2A-4A.

Illustrated in FIG. 5A is a flow chart describing an example of the operation of the configuration process 120 on a server 11 utilized in the GPS tracking system 100 of the present invention, as shown in FIGS. 1-3. The configuration process 120 collects the updates required to be pushed down or requested to remote device 15. The configuration process 120, after initialization, listens on a configurable port for connections from clients or a configuration message from server 11 at step 122.

After it receives a client connection from remote device 15 or configuration message from server 11, it determines if the configuration message to be sent to the remote device 15 is a bootstrap message at step 123. If it is determined at step 123 that a bootstrap message is not to be sent, then the configuration process 120 then skips to step 126. However, if it is determined at step 123, the bootstrap message is to be sent, the configuration process 120 sends the ID name, connection address of the server 11, and the check-in duration to remote device 15 at step 124. The configuration process 120 then returns to repeat steps 122 through 135.

In step 126, the configuration process 120 determines if the configuration message for remote device 15 is a server initiated update. If it is determined at step 126 that the message is a server initiated update, then the configuration process 120 skips to step 131. However, if it is determined at step 126 that the configuration message is not a server initiated update, then the configuration process 120 connects to the remote device 15 with an IP connection via an internet protocol (IP) socket at step 127. At step 128 the configuration process 120 sends the configuration command to the remote device 15 on the established IP connection. The configuration process 120 then skips to step 134.

At step 131, the configuration process 120 determines if the server initiated update is a settings update. If it is determined in step 131 that the update message is a settings update, then update settings are sent from the configuration process 120 to the remote device 15 at step 132. The configuration process 120 then skips to step 134. However, if it is determined at step 131 that the server initiated update is not a settings update, and the configuration process 120 sends the configuration command at step 133.

At step 134, the configuration process 120 then logs the success of the command or update for the remote device 15. At step 135, it is determined that there are more configuration messages to be processed. If it is determined at step 135 that there are more configuration messages to be processed, then the configuration process 120 returns to repeat steps 122 through 135. However, if it is determined at step 135 that there are no more configuration messages to be processed, then the configuration process 120 exits at step 139.

In an alternative embodiment, the configuration process 120 will maintain a connection to the client on the remote device 15 until the client terminates the connection.

Figure 5B:
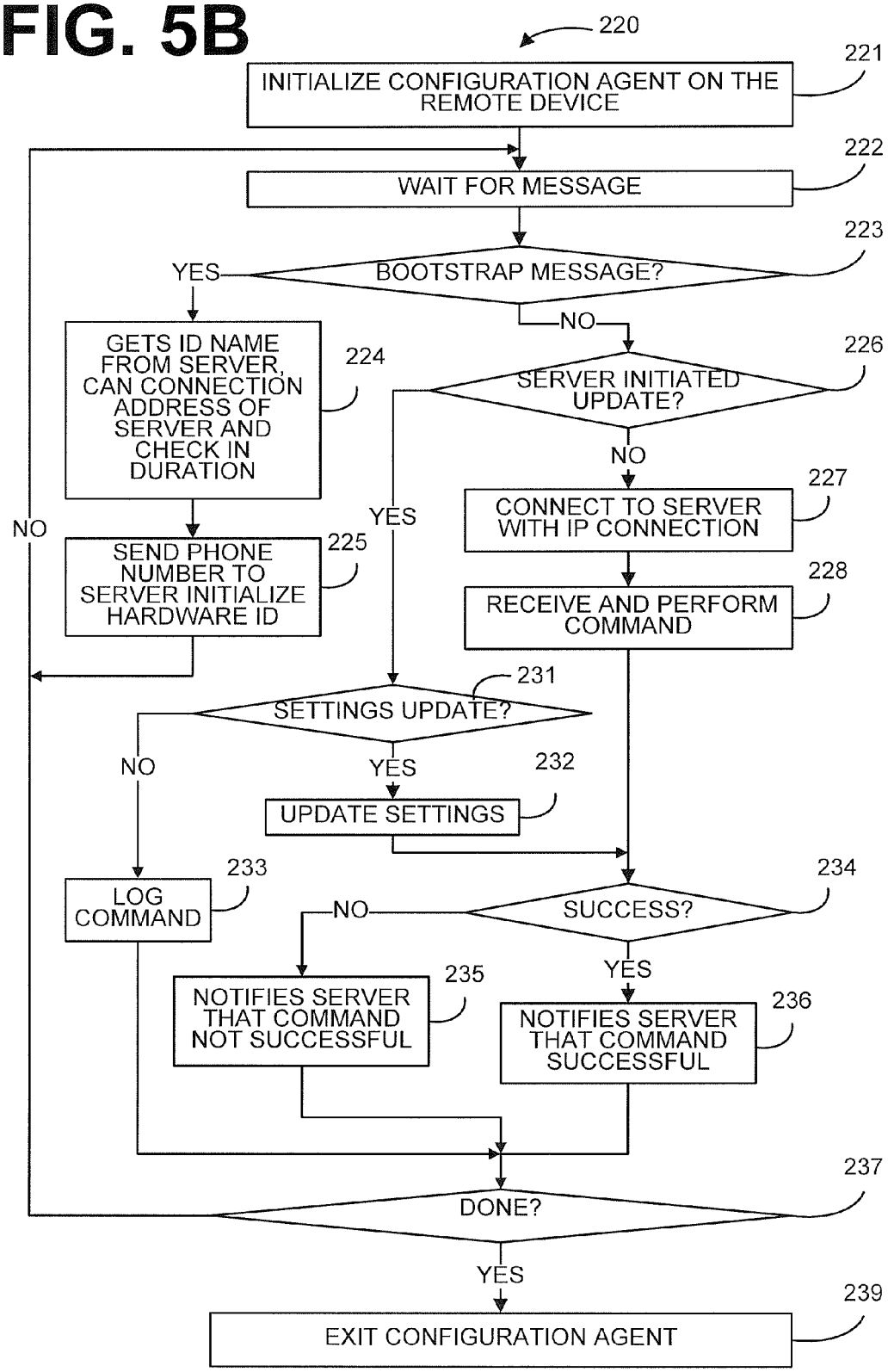
FIG. 5B is a flow chart illustrating an example of the operation of the configuration agent utilized on the remote device for the GPS tracking system of the present invention, as shown in FIGS. 2A-4B.

Illustrated in FIG. 5B is a flow chart describing an example of the operation of the configuration agent 220 on a remote device 15 utilized in remote device GPS tracking system 200 of the present invention, as shown in FIGS. 1-4B. The configuration agent 220 collects the updates required to be pushed down or requested by remote device 15. The configuration agent 220, after initialization, listens on a configurable port for connections or a configuration message from server 11 at step 222.

After it receives a connection or configuration message from server 11, configuration agent 220 determines if the configuration message being sent to the remote device 15 is a bootstrap message at step 223. If it is determined at step 223 that a bootstrap message is not to be sent, then the configuration agent 220 then skips the step 226. However, if it is determined at step 223, the bootstrap message is to be sent, the configuration agent 220 receives the ID name, connection address of the server 11, and the check-in duration for the remote device 15 at step 224. The configuration agent 220 then returns to repeat steps 222 through 237.

Step 226, the configuration agent 220 determines if the configuration message for remote device 15 is a server initiated update. If it is determined at step 226 that the message is a server initiated update, then the configuration agent 220 skips to step 231. However, if it is determined at step 226 that the configuration message is not a server initiated update, then the configuration agent 220 connects the remote device 15 to server 11 with an IP connection via an internet protocol (IP) socket at step 227. At step 228 the configuration agent 220 receives the configuration command to the remote device 15 on the established IP connection. The configuration agent 220 then skips to step 234.

At step 231, the configuration agent 220 determines if the server initiated update is a settings update. If it is determined in step 231 that the update message is a settings update, then update settings is processed for the remote device by the configuration agent 220 at step 232. The configuration agent 220 then skips to step 234. However, if it is determined at step 231 that the server initiated update is not a settings update, and then the configuration agent 220 logs the configuration command at step 233.

At step 234, the configuration agent 220 then determines if the update was a success. If the update was applied with success, then the configuration agent 220 then notifies the server 11 that the command was successfully applied at step 236. Otherwise, if it is determined at step 234 that the update was not a success, then the configuration agent 220 notifies the server 11 that the command update was not successful at step 235.

At step 237, it is determined if there are more configuration messages to be processed. If it is determined at step 237 that there are more configuration messages to be processed, then the configuration agent 220 returns to repeat steps 222 through 237. However, if it is determined at step 237 that there are no more configuration messages to be processed, then the configuration agent 220 exits at step 239.

Figure 6A:
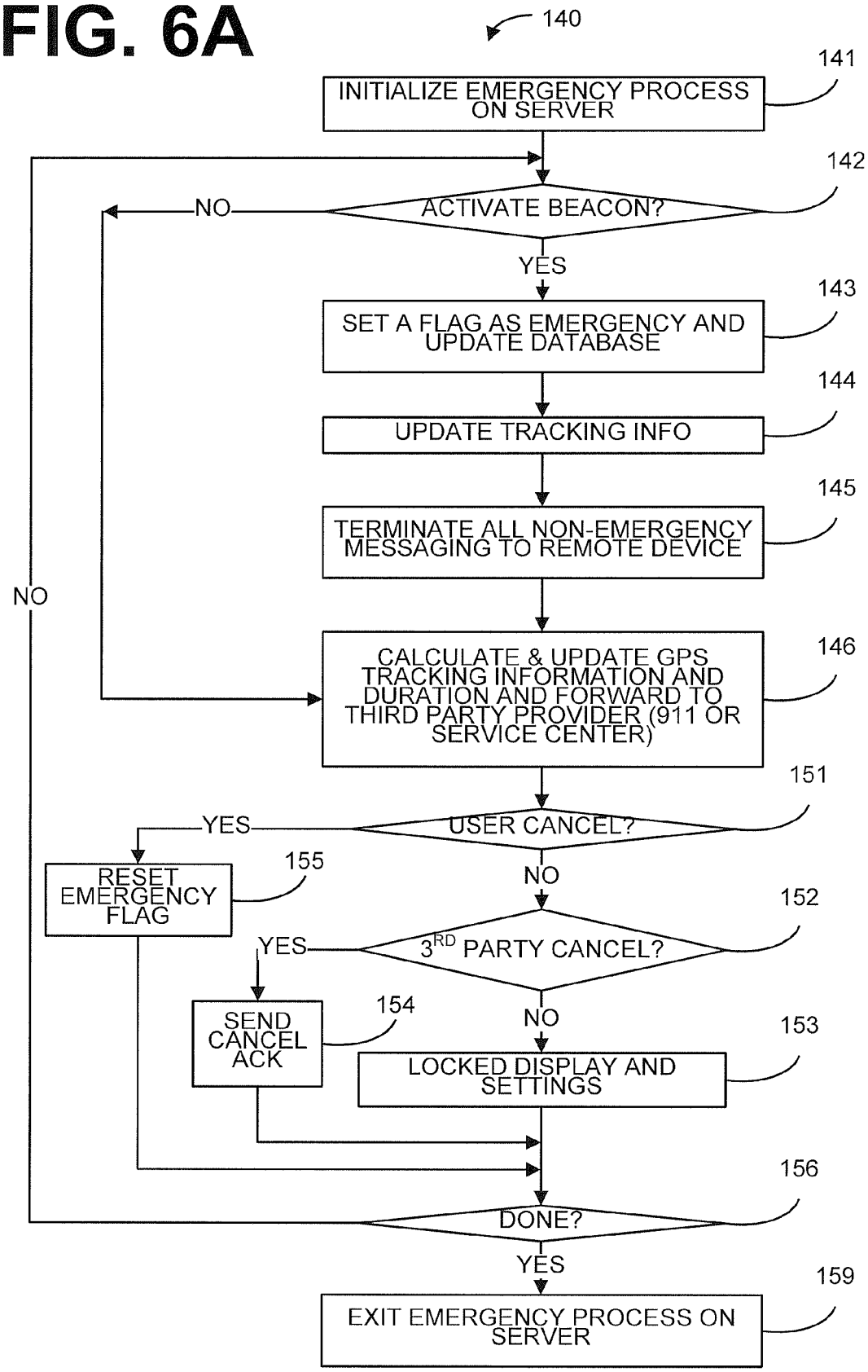
FIG. 6A is a flow chart illustrating an example of the operation of the emergency process utilized by the GPS tracking system of the present invention, as shown in FIGS. 2A-5A.

Illustrated in FIG. 6A is a flow chart describing an example of the operation of the emergency process 140 utilized by the GPS tracking system 100 of the present invention, as shown in FIGS. 2A-4A. The emergency process 140 collects tracking information from remote device 15 in order to calculate updated GPS tracking information, and forwarding that information onto third-party providers such as 911 or service centers.

First, the emergency process 140 is initialized on the server 11 at step 141, and performs similar functions as the initialization of the GPS tracking system 100 as described above. The initialization also includes the establishment of data values for particular data structures utilized in the emergency process 140. At step 142, the emergency process 140 determines if the message received is to activate an emergency beacon. If it is determined at step 142 that the message received is not to activate an emergency beacon, then the emergency process 140 then skips to step 146.

However, if it is determined that message received is to activate an emergency beacon or is updating information with regard to emergency process that is flagged as an emergency, then the emergency process 140 sets a flag in database 12, indicating that remote device 15 has an emergency. At step 144, updated tracking information is received. At step 145, the emergency process 140 terminates all non-emergency messaging to the remote device 15. This is done in order to prohibit any occurrence of a server 11 from distracting the user of remote device 15, limit usage of available network bandwidth, limit remote device processing power and control battery usage.

At step 146, emergency process 140 calculates the updated GPS tracking information in the duration of the emergency and forwards this data to third-party providers such as 911 or a service center. The third party provider or service center indicated would be third party vendors server 21 and databases 22 (FIG. 1).

At step 151, the emergency process 140 determines if the user of a remote device 15 is canceling the emergency. The user would cancel the emergency by deactivating the emergency button. If it is determined at step 151 that the user is canceling the emergency, then the emergency process 140 resets the emergency flag in database 12 for the remote device 15 and skips to step 156.

However, if it is determined at step 151 that the user is not canceling the emergency, then the emergency process 140 determines if the third party is canceling the emergency at step 152. If it is determined at step 152 that a third party is not canceling the emergency, then the emergency process 140 locks the remote device 15 in the emergency state on the remote device at step 153, and then skips to step 156. However, if it is determined at step 152 that a third party is canceling the emergency, the emergency process 140 sends a cancel and acknowledgment at step 154 and skips to step 156.

At step 156, the emergency process 140 of the present invention determines if more emergency messages are to be processed. If it is determined at step 156 that there are more emergency messages to be processed, the emergency process 140 then returns to repeat steps 142 through 156. However, if it is determined at step 156 that there are no more emergency messages to be processed, then the emergency process 140 exits at step 159.

Illustrated in FIG. 6B is a flow chart describing an example of the operation of the emergency agent 240 utilized by remote device GPS tracking system 200 of the present invention, as shown in FIGS. 2A-4B. The emergency agent 240 collects tracking information on remote device 15 in order to send emergency GPS tracking information to server 11.

First, the emergency agent 240 is initialized on the remote device 15 at step 241, and performs similar functions as the initialization of remote device GPS tracking system 200 as described above. The initialization also includes the establishment of data values for particular data structures utilized in the emergency agent 240. At step 242, the emergency agent 240 determines if the message received is to activate an emergency. In the preferred embodiment, an emergency is activated by pressing the emergency button. If it is determined at step 242 that the emergency button was not pressed, then the emergency agent 240 then skips to step 253.

However, if it is determined that the emergency button was pressed, and then the emergency agent to 240 then sets the display countdown at step 243. The displayed countdown of the amount of time that the user has to deactivate the emergency button before the emergency sequence is placed into service.

At step 244, it is determined if the emergency button was the pressed longer than the display countdown. This is an order to enable a user to deactivate an emergency process before the emergency sequence is placed into service. If it is determined at step 244 that the emergency button duration was not sufficient, then the emergency agent to 240 then skips to step 253.

However, if it is determined at step 244 that the button was depressed for a sufficient duration, the emergency agent to 240 blocks the input to the remote device 15 at step 245. At step 246, the remote device 15 starts the GPS tracking data including ID cell tower signal strength, duration since activation, date and time of the message, GPS location then includes latitude and longitude, the number of satellites detected by the remote device and the battery level of the remote device and any other required status information.

At step 251, the emergency agent to 240 then sends an SMS message with the tracking data to server 11 indicating that there is an emergency situation. At step 252, emergency agent to 240 then places a call to 911 or a user defined pre-set third-party call center.

At step 253, the emergency agent 240 determines if the user deactivates the emergency process. If it is determined in step 253 that the user does deactivate the emergency situation, then the emergency agent 240 then returns to repeat steps 242 through 255. However, if it is determined in step 253 that the user did not attempt to deactivate the emergency situation, then the emergency agent 240 sends an SMS message with updated tracking data to server 11 on a predetermined time interval until the emergency agent 240 is deactivated At step 255, the emergency agent 240 of the present invention determines if more emergency messages are to be processed. If it is determined at step 255 that there are more emergency messages to be processed, and the emergency agent 240 then returns to repeat steps 242 through 256. However, if it is determined at step 256 that there are no more emergency messages to be processed, then the emergency agent 240 exits at step 259.

Illustrated in FIG. 7A is a flow chart describing an example of the operation of the tracking process 160 utilized by the GPS tracking system 100 of the present invention, as shown in FIGS. 2A-4A. The tracking process 160 is responsible for non-emergency tracking information and determining if the remote device being tracked is within the parameters.

First, at step 161, the tracking process 160 is initialized on the server 11 and performs similar functions as the initialization of the GPS tracking system 100 as described above. The initialization also includes the establishment of data values for particular data structures utilized in the tracking process 160.

At step 162, the tracking process 160 receives tracking information from the remote device 15 and updates the tracking information in database 12. At step 163, the tracking process 160 forwards the tracking information to a tracking server or third party vendors server 21. This is in order to provide tracking information to an enterprise.

At step 160, it is determined that the track information is within known parameters. This determines that the track of the remote device 15 is within predetermined boundaries. In one example, the remote device could be assigned to an operator of delivery trucks such as for example, but not limited to, UPS trucks, United States Postal Service, Federal Express or the like. In other examples, the remote device 15 could be provided to one's teenage child to make sure that the child does not go out of state. If it is determined in step 164 that the track information is not within known parameters, and the tracking process 160 skips to step 166.

At step 165, if the tracking data is within known parameters it sets an active notification to the third party vendors server 21.

At step 166, it is determined if there are more tracking messages to be processed. If it is determined that there are more tracking messages to be processed, then the tracking process 160 returns to repeat steps 162 through 166. However, if it is determined at step 166 that there are no more tracking messages to be processed, then the tracking process 160 exits at step 169.

Figure 7B:
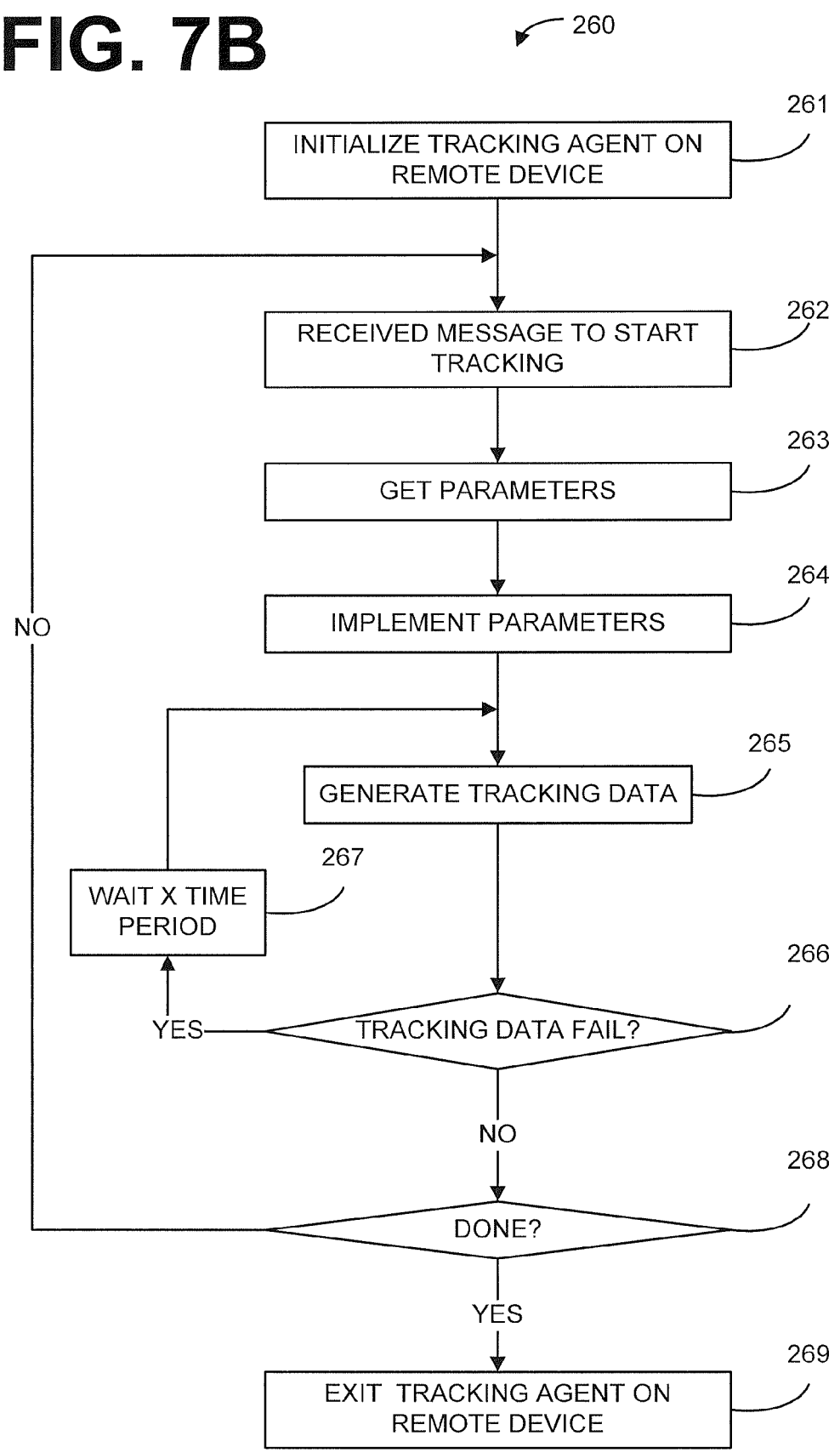
FIG. 7B is a flow chart illustrating an example of the operation of the tracking agent utilized on the remote device for the GPS tracking system of the present invention, as shown in FIGS. 2A-6B.

Illustrated in FIG. 7B is a flow chart describing an example of the operation of the tracking agent 260 utilized by remote device GPS tracking system 200 of the present invention, as shown in FIGS. 2B-4B. The tracking agent 260 is responsible for non-emergency tracking information collected by the remote device 15.

First, at step 261, the tracking agent 260 is initialized on the remote device 15 and performs similar functions as the initialization of remote device GPS tracking system 200 as described above. The initialization also includes the establishment of data values for particular data structures utilized in the tracking agent 260.

At step 262, the tracking agent 260 receives a message to start collecting tracking information on the remote device 15. At step 263, in tracking agent to 260 gets various GPS tracking information. The GPS tracking information, collected includes, but are is not limited to, cell tower ID, signal strength, duration since activation of the tracking, date and time of the tracking parameters, GPS location including latitude and longitude, number of satellites detected, the altitude of the remote device, and other status info.

At step 264, the parameters are implemented. The handset starts recording and sending of location data based on the parameters.

At step 265, the tracking data is generated based on the GPS hardware on remote device 15.

At step 266, it is determined if the attempt to generate tracking data has failed. If it is determined at step 266 that the attempt to generate tracking data has failed, and the tracking agent 260 waits a predetermined time at step 267 before attempting to retry the generation of tracking data at step 265.

However, if it is determined at step 267 that the generation of tracking data was successful, then the tracking agent 260 determines in step 268 if more tracking data is to be generated.

If it is determined that there are more tracking messages to be generated, then the tracking agent 260 returns to repeat steps 262 through 268. However, if it is determined at step 268 that there are no more tracking messages to be generated, then the tracking agent 260 exits at step 269.

Figure 8A:
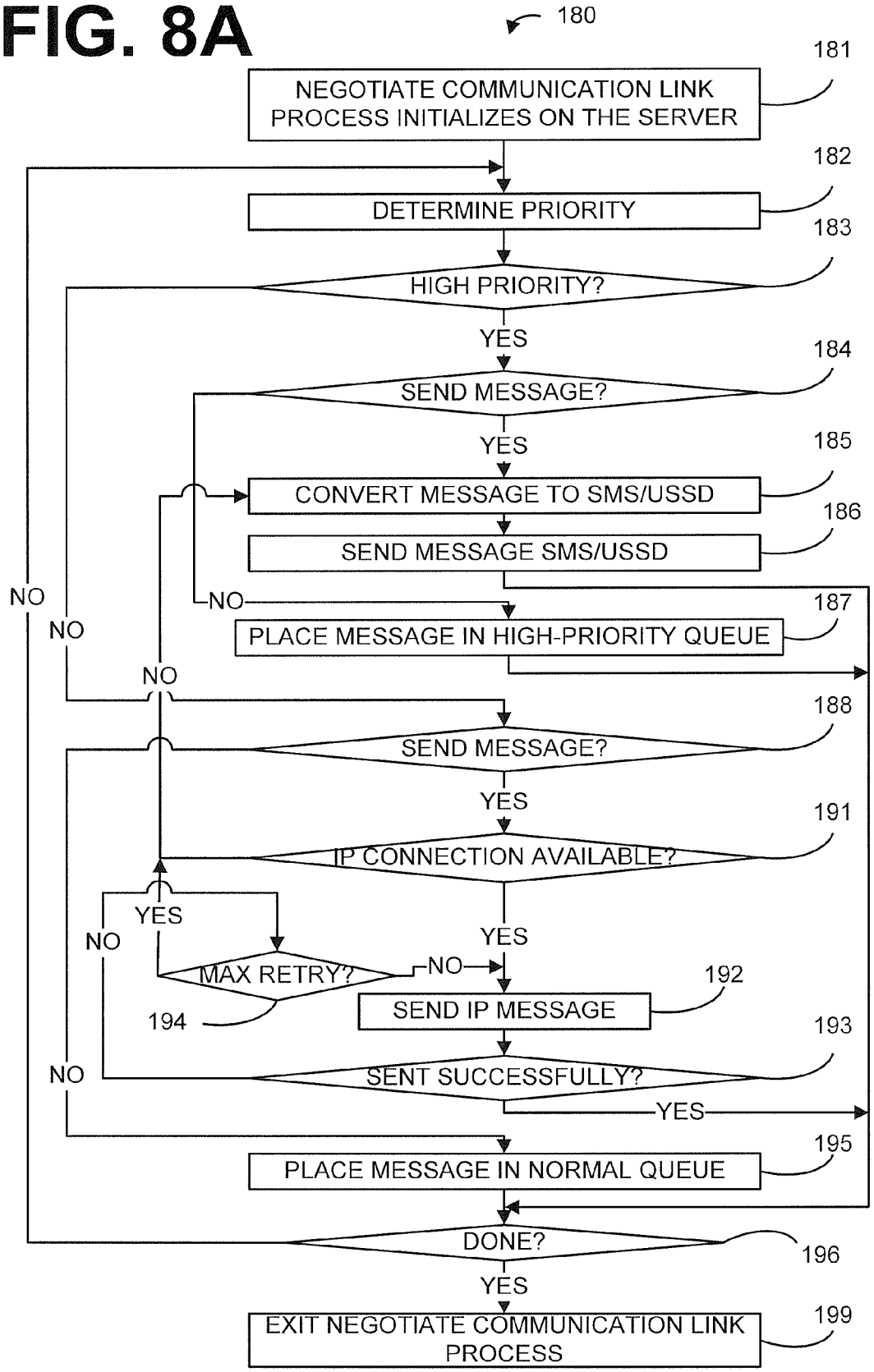
FIG. 8A is a flow chart illustrating an example of the operation of the negotiate communication link process utilized by the GPS tracking system of the present invention, as shown in FIGS. 2A-7A.

Illustrated in FIG. 8A is a flow chart describing an example of the operation of the negotiate communication link process 180 utilized by the GPS tracking system 100 of the present invention on server 11, as shown in FIGS. 2A-4A. The negotiate communication link process 180 starts the message processing by determining the priority and communication link needed by a message to be sent or received.

Once the priority of a message is determined, the negotiate communication link process 180 will determine which communication method to use in order to transmit or receive the message. If the negotiate communication link process 180 has registered the server 11 as IP capable, the message will be sent over the IP link. Otherwise, the message will be sent via SMS via SMPP or other protocols if the server 11 is SMS capable.

First, at step 181, the negotiate communication link process 180 is initialized on the server 11 and performs similar functions as the initialization of the GPS tracking system 100 as described above. The initialization also includes the establishment of data values for particular data structures utilized in the negotiate communication link process 180.

At step 182, the priority of the message to be sent or received on server 11 is determined. At step 183, it is determined if the message to be sent or received is high priority. If it is determined at step 183 that the message to be sent or received is not a high priority, then the negotiate communication link process 180 proceeds to step 188. However, if it is determined at step 183 that the message to be sent or received is high priority, then the negotiate communication link process 180 determines if the message is to be sent at step 184. If it is determined at step 184 that the message is not to be sent, then the negotiate communication link process 180 skip to step 187.

However, if it is determined at step 184 that the message to be processed is a high-priority send message, then the message is converted to SMS or USSD. The negotiate communication link process 180 will attempt to send a message via SMS via SMPP or other protocols before dropping down to the default of USSD at step 186. The negotiate communication link process 180 then skips to step 196.

At step 187, the negotiate communication link process 180 places the message received in the high priority queue and then skips to step 196.

At step 188, it is determined if the normal priority message is to be sent. If it is determined at step 188 that the normal message is not to be sent, but instead to be received, then the negotiate communication link process 180 then skips to step 195. However, if it is determined at step 188 that the normal priority message is to be sent, then it determines in step 191 if an IP connection is available for the message. If it is determined in step 191 that an IP connection is not available, then the negotiate communication link process 180 send a message via SMS or USSD by repeating steps 185 through 186. However, if it is determined at step 191 that an IP connection is available, then the negotiate communication link process 180 sends the message at step 192 utilizing the IP communication link.

At step 193, it is determined if the IP message was successfully sent. If it is determined at step 193 that the IP message was successfully sent, the negotiate communication link process 180 then skips to step 196. However, if it is determined at step 193 that the IP message was not successfully sent, then the negotiate communication link process 180 determines if the maximum retry limit for sending a message on any IP communication link has been reached at step 194.

If it is determined that the maximum retry count has been reached, then the negotiate communication link process 180 changes the communication link being utilized by sending the message via SMS or USSD by repeating steps 185 through 186. However, if it is determined at step 194 that the maximum retry count had not been exceeded, then the negotiate communication link process 180 repeats steps 192 and 193 to attempt to resend the message using the IP connection.

At step 195, the negotiate communication link process 180 places the normal priority message being received in the normal queue on server 11.

At step 196, the negotiate communication link process 180 determines if there are more messages to be sent and received. If it is determined at step 196 that there are more messages to be sent and received, the negotiate communication link process 180 then returns to repeat steps 182 through 196. However, if it is determined that there are no more messages to be sent or received, the negotiate communication link process 180 then exits at step 199.

Figure 8B:
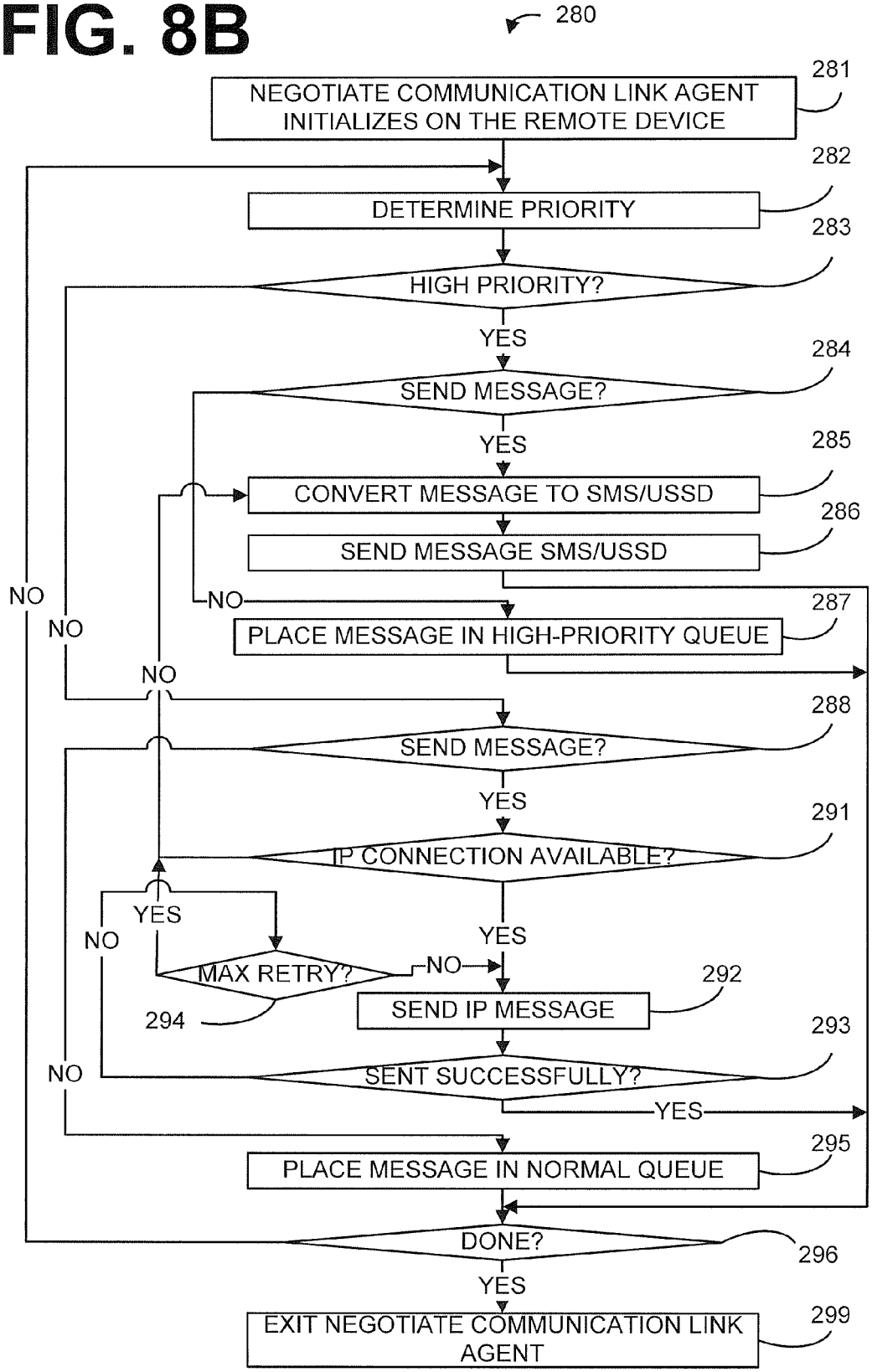
FIG. 8B is a flow chart illustrating an example of the operation of the negotiate communication link agent utilized on the remote device for the GPS tracking system of the present invention, as shown in FIGS. 2A-7B.

Illustrated in FIG. 8B is a flow chart describing an example of the operation of the negotiate communication link agent 280 utilized by remote device GPS tracking system 200 of the present invention, as shown in FIGS. 2B-4B. The negotiate communication link agent 280 starts the message process by determining the priority and communication link utilized by a message to be sent or received on remote device 15.

Once the priority of a message is determined, the negotiate communication link agent 280 will determine which communication method to use in order to transmit or receive the message. If the negotiate communication link agent 280 has registered the remote device 15 as IP capable, the message will be sent over the IP link. Otherwise, the message will be sent via SMS over SMPP or other protocols if the device is SMS capable.

First, at step 281, the negotiate communication link agent 280 is initialized on the remote device 15 and performs similar functions as the initialization of remote device GPS tracking system 200 as described above. The initialization also includes the establishment of data values for particular data structures utilized in the negotiate communication link agent 280.

At step 282, the priority of the message to be sent or received on the remote device 15 is determined. At step 283, it is determined if the message to be sent or received is high priority. If it is determined at step 283 that the message to be sent or received is not a high priority, then the negotiate communication link agent 280 proceeds to step 288. However, if it is determined at step 283 that the message to be sent or received is high priority, then the negotiate communication link agent 280 determines if the message is to be sent at step 284. If it is determined at step 284 that the message is not to be sent, then the negotiate communication link agent 280 skips to step 287.

However, if it is determined at step 284 that the message to be sent is a high-priority send message, then the message is converted to SMS or USSD. The negotiate communication link agent 280 on the remote device 15 will attempt to send a message via SMS over SMPP or other protocols before dropping down to the default of USSD at step 286. The negotiate communication link agent 280 then skips to step 296.

At step 287, the negotiate communication link agent 280 places the message received in the high priority queue and then skips to step 296.

At step 288, it is determined if the normal priority message is to be sent. If it is determined at step 288 that the normal message is not to be sent, but instead to be received, then the negotiate communication link agent 280 then skips to step 295. However, if it is determined at step 288 that the normal priority message is to be sent, then it determines in step 291 if an IP connection is available for the message. If it is determined in step 291 that an IP connection is not available, then the negotiate communication link agent 280 send a message via SMS or USSD by repeating steps 285 through 286. However, if it is determined at step 291 that an IP connection is available, then the negotiate communication link agent 280 sends the message at step 282 utilizing the IP communication link.

At step 293, it is determined if the IP message was successfully sent. If it is determined at step 293 that the IP message was successfully sent, the negotiate communication link agent 280 then skips to step 296. However, if it is determined at step 293 that the IP message was not successfully sent, then the negotiate communication link agent 280 determines if the maximum retry limit for sending a message on any IP communication link has been reached at step 294. If it is determined that the maximum retry count has been reached, then the negotiate communication link agent 280 changes the communication link being utilized by sending the message via SMS or USSD by repeating steps 285 through 286. However, if it is determined at step 294 that the maximum retry count had not been exceeded, then the negotiate communication link agent 280 repeats steps 292 and 293 to attempt to resend the message using the IP connection on remote device 15.

At step 295, the negotiate communication link agent 280 places the normal priority message being received in the normal queue on remote device 15.

At step 296, the negotiate communication link agent 280 determines if there are more messages to be sent and received. If it is determined at step 296 that there are more messages to be sent and received, then the negotiate communication link agent 280 then returns to repeat steps 282 through 296. However, it is determined that there are no more messages to be sent or received, then the negotiate communication link agent 280 then exits at step 299.

Figure 9:
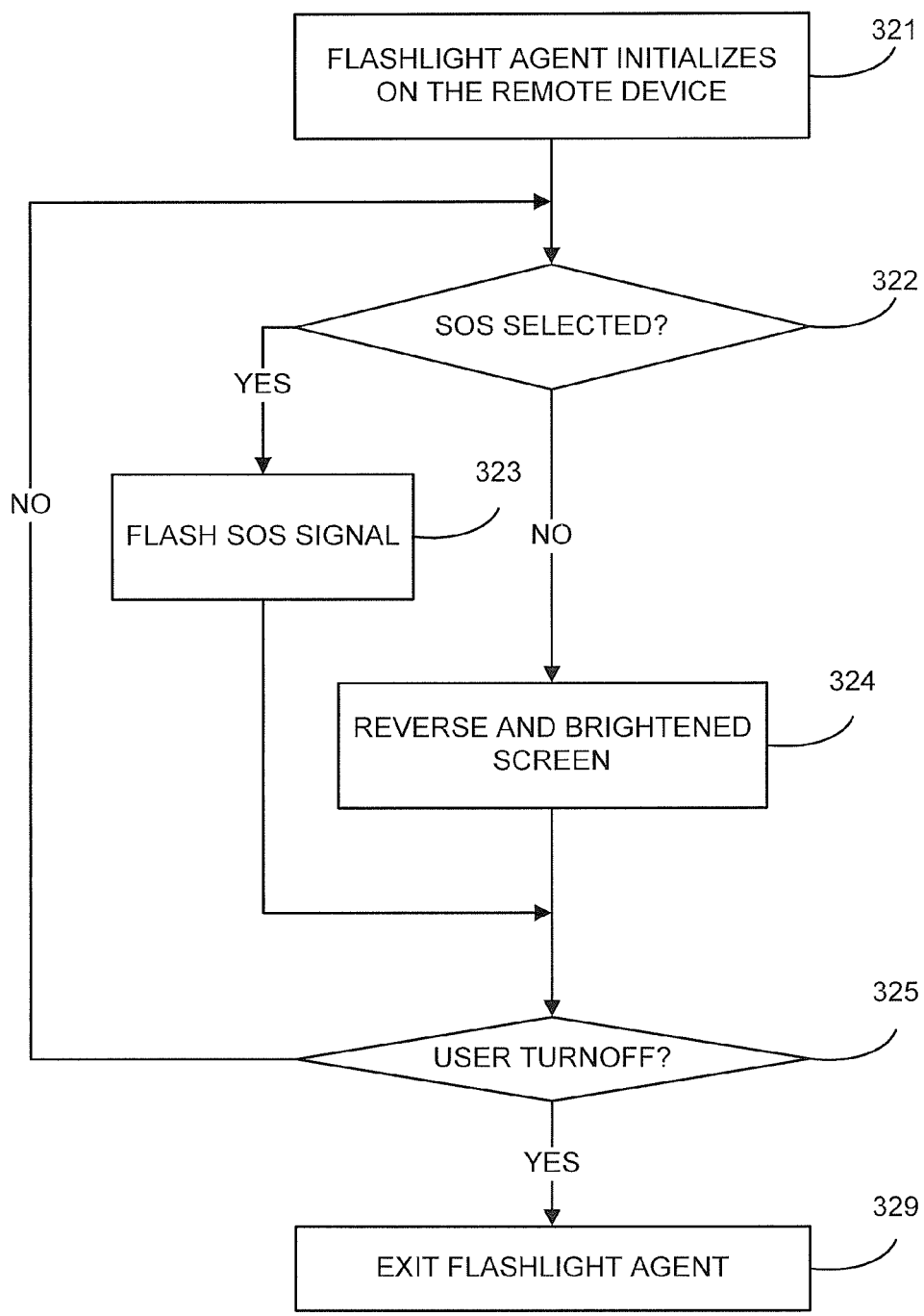
FIG. 9 is a flow chart illustrating an example of the operation of the flashlight agent utilized on the remote device for the GPS tracking system of the present invention, as shown in FIGS. 2A-8B.

Illustrated in FIG. 9 is a flow chart describing an example of the operation of the flashlight agent 320 utilized on the remote device 15 for remote device GPS tracking system 200 of the present invention, as shown in FIGS. 1 and 2B. The flashlight agent 320 energizes the screen so that it may act as a flashlight.

First, at step 321, the flashlight agent 320 is initialized on the remote device 15. The initialization also includes the establishment of data values for particular data structures utilized in the flashlight agent 320.

At step 322, it is determined if the SOS function is selected. If it is determined at step 322 that the flash SOS signal is selected, then the flashlight agent 320 then flashes the SOS signal at step 323 and skips to step 325. However, if it is determined at step 322 that the SOS is not selected, then the flashlight agent reverses and brightens the screen of the remote device 15 at step 324.

At step 325, the flashlight agent determines if the user has initiated the turnoff of either the flash SOS signal or the screen brighten function. If it is determined at step 325 that the user has not turned off the SOS signal or the screen brighten signal, then the flashlight agent 320 then returns to repeat steps 322-325. Otherwise, the flashlight agent 320 turns off the SOS signal or the screen-brighten signal at step 325 and exits at step 329.

Any process descriptions or blocks in flow charts should be understood as representing modules, segments, or portions of code which include one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A system for remotely monitoring and tracking a mobile hand-held device, the system having a server configured to communicate electronically with the mobile hand-held device, the mobile hand-held device having conventional voice and data communication capabilities and further having a processor and software code stored in memory on the mobile hand-held device, the software code including instructions executable by the processor that performs the steps of:
   establishing a data communication link with the server;
   detecting activation of an emergency button on the mobile hand-held device, activation of the emergency button causing the mobile hand-held device to operate in an emergency condition; and
   as long as the mobile hand-held device is operating in the emergency condition, performing the additional steps of:
      blocking non-emergency input into the mobile hand-held device to disable non-emergency processes on the mobile hand-held device;
      at predetermined time intervals, determining a current location of the mobile hand-held device based on GPS tracking information and mobile communication information collected by the mobile hand-held device;
      storing the current location of the mobile hand-held device and corresponding time-stamp information associated with each respective predetermined time interval in memory on the mobile hand-held device, the current location of the mobile hand-held device and corresponding time-stamp information representing time-based tracking data associated with the mobile hand-held device; and
      using the data communication link, periodically transmitting a telematics logic message to the server, the telematics logic message including a device ID unique to the mobile hand-held device, an indicator that the mobile hand-held device is operating in the emergency condition, and the time-based tracking data.

2. The system for remotely monitoring and tracking a mobile hand-held device of claim 1 wherein detecting activation of the emergency button comprises detecting physical depression of the emergency button for a predetermined period of time.

3. The system for remotely monitoring and tracking a mobile hand-held device of claim 2 wherein the emergency button is not activated if the emergency button is not physical depressed for the predetermined period of time.

4. The system for remotely monitoring and tracking a mobile hand-held device of claim 2 wherein, during physical depression of the emergency button, displaying a countdown clock on a display screen of the mobile hand-held device, the countdown clock indicating the amount of time remaining before expiration of the predetermined period of time.

5. The system for remotely monitoring and tracking a mobile hand-held device of claim 2 wherein cessation of physical depression of the emergency button prior to expiration of the predetermined period of time resets the predetermined period of time.

6. The system for remotely monitoring and tracking a mobile hand-held device of claim 1 wherein the indicator of the emergency condition comprises a pre-arranged port number known by the server and the mobile hand-held device.

7. The system for remotely monitoring and tracking a mobile hand-held device of claim 1 wherein the telematics logic message is encrypted using a key known by the server and the mobile hand-held device.

8. The system for remotely monitoring and tracking a mobile hand-held device of claim 1 wherein the telematics logic message is transmitted as an SMS message.

9. The system for remotely monitoring and tracking a mobile hand-held device of claim 1 wherein the telematics logic message is transmitted as a USSD message.

10. The system for remotely monitoring and tracking a mobile hand-held device of claim 1 wherein the telematics logic message further includes an indication of remaining battery life of a battery used by the mobile hand-held device.

11. The system for remotely monitoring and tracking a mobile hand-held device of claim 1 wherein, if the data communication link is lost, the telematics logic message is queued in memory on the mobile hand-held device for later retransmission when the data communication link with the server is re-established.

12. The system for remotely monitoring and tracking a mobile hand-held device of claim 1 wherein, if the data communication link is lost, transmission of the telematics logic message is attempted using different communication protocols.

13. The system for remotely monitoring and tracking a mobile hand-held device of claim 1 wherein the GPS tracking information is obtained from GPS satellites and includes one or more of longitude and latitude of the mobile hand-held device, number of GPS satellites detected by the mobile hand-held device, and altitude of the mobile hand-held device.

14. The system for remotely monitoring and tracking a mobile hand-held device of claim 1 wherein the mobile communication information includes a cell tower ID for each cell tower detected by the mobile hand-held device, and further includes signal strength and corresponding time-stamp information associated with each respective cell tower when detected by the mobile hand-held device.

15. The system for remotely monitoring and tracking a mobile hand-held device of claim 1 wherein, as long as the mobile hand-held device is operating in the emergency condition, further performing the step of activating a display screen of the mobile hand-held device to act as a flashlight.

16. The system for remotely monitoring and tracking a mobile hand-held device of claim 1 wherein, as long as the mobile hand-held device is operating in the emergency condition, further performing the step of causing a display screen of the mobile hand-held device to flash in an SOS pattern.

17. The system for remotely monitoring and tracking a mobile hand-held device of claim 1 further comprising the step of detecting de-activation of the emergency button on the mobile hand-held device, wherein de-activation of the emergency button causes the mobile hand-held device to cease operating in the emergency condition.

18. The system for remotely monitoring and tracking a mobile hand-held device of claim 17 wherein, when the mobile hand-held device ceases operating in the emergency condition, further performing the step of using the data communication link to transmit an updated telematics logic message to the server, the updated telematics logic message including the device ID and an updated indicator that the mobile hand-held device is no longer operating in the emergency condition.

19. The system for remotely monitoring and tracking a mobile hand-held device of claim 1 wherein non-emergency input comprises conventional voice and data communications other than to previously-designated emergency contacts and use of non-essential software applications installed on the mobile hand-held device.

20. The system for remotely monitoring and tracking a mobile hand-held device of claim 1 wherein the step of blocking non-emergency input into the mobile hand-held device preserves battery life of a battery used by the mobile hand-held device.

* * * * *